(12) United States Patent
Ramasubramonian et al.

(10) Patent No.: US 10,390,087 B2
(45) Date of Patent: Aug. 20, 2019

(54) HYPOTHETICAL REFERENCE DECODER PARAMETERS FOR PARTITIONING SCHEMES IN VIDEO CODING

(71) Applicant: QUALCOMM Incorporated, San Diego, CA (US)

(72) Inventors: Adarsh Krishnan Ramasubramonian, San Diego, CA (US); Ye-Kui Wang, San Diego, CA (US); Fnu Hendry, Poway, CA (US); Krishnakanth Rapaka, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 456 days.

(21) Appl. No.: 14/700,953

(22) Filed: Apr. 30, 2015

(65) Prior Publication Data

US 2015/0319462 A1 Nov. 5, 2015

Related U.S. Application Data

(60) Provisional application No. 61/987,463, filed on May 1, 2014, provisional application No. 61/993,980, filed on May 15, 2014.

(51) Int. Cl.
*H04N 19/00* (2014.01)
*H04N 21/45* (2011.01)
(Continued)

(52) U.S. Cl.
CPC ....... *H04N 21/4516* (2013.01); *H04N 19/127* (2014.11); *H04N 19/157* (2014.11);
(Continued)

(58) Field of Classification Search
CPC ........ H04N 19/44; H04N 19/42; H04N 19/30; H04N 19/156; H04N 19/423;
(Continued)

(56) References Cited

U.S. PATENT DOCUMENTS 8,341,168 B1 * 12/2012 Velthoen ................. 707/758
8,406,292 B2 * 3/2013 Shimada ............. G11B 27/034
375/240.01
(Continued)

FOREIGN PATENT DOCUMENTS

CN 101795344 A 8/2010
CN 102769747 A 11/2012
(Continued)

OTHER PUBLICATIONS

Response to Second Written Opinion dated Apr. 28, 2016, from International Application No. PCT/US2015/028795, filed on Jun. 8, 2016, 22 pp.
(Continued)

*Primary Examiner* — Frank F Huang
(74) *Attorney, Agent, or Firm* — Shumaker & Sieffert, P.A.

(57) ABSTRACT

A video processing device is configured to obtain, from a bitstream, one or more syntax elements indicating one or more partitioning schemes for an output layer set. For each respective partitioning scheme of the one or more partitioning schemes, the respective partitioning scheme specifies a division of the output layer set into one or more partitions. Each layer in the output layer set belongs to exactly one partition in the respective partitioning scheme. Additionally, the video processing device obtains, from a Supplemental Enhancement Information (SEI) message or video usability information (VUI) in a video parameter set (VPS), hypothetical reference decoder (HRD) parameters for each of the one or more partitioning schemes. For each respective partition of the respective partitioning scheme, the video processing device tests, based on the HRD parameters for the respective partitioning scheme, the respective partition for conformance to a video coding standard.

29 Claims, 7 Drawing Sheets

(51) Int. Cl.

| | |
|---|---|
| *H04N 19/85* | (2014.01) |
| *H04N 19/48* | (2014.01) |
| *H04N 19/39* | (2014.01) |
| *H04N 19/29* | (2014.01) |
| *H04N 21/2343* | (2011.01) |
| *H04N 19/187* | (2014.01) |
| *H04N 19/44* | (2014.01) |
| *H04N 19/70* | (2014.01) |
| *H04N 19/66* | (2014.01) |
| *H04N 19/30* | (2014.01) |
| *H04N 19/127* | (2014.01) |
| *H04N 19/157* | (2014.01) |
| *H04N 19/436* | (2014.01) |
| *H04N 21/81* | (2011.01) |

(52) U.S. Cl.
CPC ........... *H04N 19/187* (2014.11); *H04N 19/29* (2014.11); *H04N 19/30* (2014.11); *H04N 19/39* (2014.11); *H04N 19/436* (2014.11); *H04N 19/44* (2014.11); *H04N 19/48* (2014.11); *H04N 19/66* (2014.11); *H04N 19/70* (2014.11); *H04N 19/85* (2014.11); *H04N 21/234327* (2013.01); *H04N 21/816* (2013.01)

(58) Field of Classification Search
CPC .. H04N 19/152; H04N 19/433; H04N 19/597; H04N 19/70; H04N 19/436; H04N 19/004
See application file for complete search history.

(56) References Cited

U.S. PATENT DOCUMENTS

| | | | | |
|---|---|---|---|---|
| 8,699,581 | B2* | 4/2014 | Koyabu | G11B 27/005 375/240.12 |
| 2006/0120463 | A1* | 6/2006 | Wang | H04N 19/70 375/240.25 |
| 2007/0230564 | A1 | 10/2007 | Chen et al. | |
| 2013/0322542 | A1 | 12/2013 | Senzaki et al. | |
| 2013/0336397 | A1 | 12/2013 | Senzaki et al. | |
| 2014/0086303 | A1* | 3/2014 | Wang | H04N 19/70 375/240.02 |
| 2014/0086333 | A1* | 3/2014 | Wang | H04N 19/70 375/240.25 |
| 2014/0269899 | A1 | 9/2014 | Park et al. | |
| 2014/0301453 | A1 | 10/2014 | Deshpande et al. | |
| 2014/0301463 | A1 | 10/2014 | Rusanovskyy et al. | |
| 2015/0078456 | A1* | 3/2015 | Hannuksela | H04N 19/70 375/240.25 |
| 2015/0103921 | A1* | 4/2015 | Hannuksela | H04N 19/152 375/240.26 |
| 2015/0264373 | A1* | 9/2015 | Wang | H04N 19/44 375/240.25 |
| 2015/0304667 | A1 | 10/2015 | Suehring et al. | |
| 2015/0319448 | A1 | 11/2015 | Ramasubramonian | |
| 2015/0319449 | A1 | 11/2015 | Ramasubramonian | |
| 2015/0319461 | A1 | 11/2015 | Takahashi et al. | |
| 2016/0057441 | A1 | 2/2016 | Skupin et al. | |
| 2016/0065976 | A1 | 3/2016 | He et al. | |
| 2016/0065980 | A1 | 3/2016 | Choi et al. | |

FOREIGN PATENT DOCUMENTS

| | | |
|---|---|---|
| CN | 102792691 A | 11/2012 |
| CN | 102860008 A | 1/2013 |
| CN | 103338367 A | 10/2013 |
| CN | 103338369 A | 10/2013 |
| CN | 103548353 A | 1/2014 |
| TW | 201330634 A | 7/2013 |
| WO | 07115129 | 10/2007 |

OTHER PUBLICATIONS

International Preliminary Report on Patentability from International Application No. PCT/US2015/028795, dated Mar. 1, 2016, 10 pp.
Wiegand et al., "WD1 : Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.
Bross et al., "WD4: Working Draft 4 of High-Efficiency Video Coding," 6th Meeting: Torino, IT, Jul. 14-22, 2011, (Joint Collaborative Team on Video Coding of ISO/IEC JTC1/SC29/WG11 and ITU-T SG.16);JCTVC-F803_d2, Oct. 4, 2011, 226 pp.
Bross et al., "WD5: Working Draft 5 of High-Efficiency Video Coding," 7th Meeting: Geneva, Switzerland, Nov. 21-30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1-10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27-May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11-20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10-19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (for FDIS & Last Call)," 12th Meeting: Geneva, CH, Jan. 14-23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Chen, et al., "High efficiency video coding (HEVC) scalable extension Draft 6", JCT-VC Meeting; Mar. 27-Apr. 4, 2014; Valencia; (Joint Collaborative Team on Video Coding of ISO/IEC JTC1/SC29/WG11 and ITU-T SG.16 ); URL: http://wftp3.itu.int/av-arch/jctvc-site/,, No. JCTVC-Q1008, Apr. 15, 2014, XP030116232, 181 pp. [uploaded in parts].
Hannuksela, et al., "MV-HEVC/SHVC HLS / JCT-VC AHG20: Multi-layer HRD operation", JCT-VC Meeting; Oct. 23-Nov. 1, 2013; Geneva; (Joint Collaborative Team on Video Coding of ISO/IEC JTC1/SC29/WG11 and ITU-T SG.16 ); URL: http://wftp3.

(56) References Cited

OTHER PUBLICATIONS itu.int/av-arch/jctvc-site/,, No. JCTVC-00164-v2, Oct. 29, 2013, XP030115190, 5 pp.

Ramasubramonian, et al., "SHVC/MV-HEVC level definitions and related decoder capability requirements", JCT-VC Meeting; Jun. 30-Jul. 9, 2014; Sapporo; (Joint Collaborative Team on Video Coding of ISO/IEC JTC1/SC29/WG11 and ITU-T SG.16 ); URL: http://wftp3.itu.int/av-arch/jctvc-site/ No. JCTVC-R0043, May 1, 2014, XP030116281, 2 pp.

Samuelsson, et al., "Decoder parallelism indication", JCT-VC Meeting; MPEG Meeting; Oct. 10-19, 2012; Shanghai; (Joint Collaborative Team on Video Coding of ISO/IEC JTC1/SC29/WG11 and ITU-T SG.16 ); URL: http://wftp3.itu.int/av-arch/jctvc-site/, No. JCTVC-K0236, Oct. 1, 2012; XP030113118, 4 pp.

Wang, et al.,"MV-HEVC/SHVC HLS: On level definitions", JCT-3V Meeting; Mar. 27-Apr. 4, 2014; Valencia; (The Joint Collaborative Team on 3D Video Coding Extension Development of ISO/IEC JTC1/SC29/WG11 and ITU-T SG.16 ); URL: http://phenix.int-evry.fr/jct2/, No. JCT3V-H0043, Mar. 18, 2014 , XP030132092, 3 pp.

Tech, et al., "MV-HEVC Draft Text 8," JCT-3V Meeting; Mar. 29-Apr. 4, 2014; (The Joint Collaborative Team on 3D Video Coding Extension Development of ISO/IEC JTC1/SC29/WG11 and ITU-T SG.16 ); No. JCT3V-H1002_v1, Apr. 8, 2014; 133 pp.

Wang, et al., "High Efficiency Video Coding (HEVC) Defect Report 3," JCT-VC Meeting; Jan. 9-17, 2014; (The Joint Collaborative Team on 3D Video Coding Extension Development of ISO/IEC JTC1/SC29/WG11 and ITU-T SG.16 ); No. JCTVC-P1003_v1, Feb. 8, 2014; 313 pp.

Chen, et al., "High efficiency video coding (HEVC) scalable extensions Draft 5," JCT-VC Meeting; Jan. 9-17, 2014; (The Joint Collaborative Team on 3D Video Coding Extension Development of ISO/IEC JTC1/SC29/WG11 and ITU-T SG.16 ); No. JCTVC-P1008_v4, Jan. 22, 2014; 125 pp.

Wang, et al., "MV-HEVC/SHVC HLS: On level definitions," JCT-VC Meeting; Mar. 27-Apr. 4, 2014; (The Joint Collaborative Team on 3D Video Coding Extension Development of ISO/IEC JTC1/SC29/WG11 and ITU-T SG.16 ); No. JCTVC-Q0145, Mar. 18, 2014; 3 pp.

Tech, et al., "MV-HEVC Draft Text 7," JCT-3V Meeting; Jan. 11-17, 2014; (The Joint Collaborative Team on 3D Video Coding Extension Development of ISO/IEC JTC1/SC29/WG11 and ITU-T SG.16 ); No. JCT3V-G1004_v8, Mar. 17, 2014; 131 pp.

Tech, et al., "MV-HEVC Draft Text 7," JCT-3V Meeting; Jan. 11-17, 2014; (The Joint Collaborative Team on 3D Video Coding Extension Development of ISO/IEC JTC1/SC29/WG11 and ITU-T SG.16 ); No. JCT3V-G1004_v7, Feb. 28, 2014; 131 pp.

International Search Report and Written Opinion from International Application No. PCT/US2015/028795, dated Jun. 30, 2015, 15 pp.

Response to Written Opinion dated Jun. 30, 2015, from International Application No. PCT/US2015/028795, filed on Mar. 1, 2016, 6 pp.

Second Written Opinion from International Application No. PCT/US2015/028795, dated Apr. 28, 2016, 6 pp.

Ikai T., et al., "MV-HEVC/SHVC HLS: On layer set definition", 7. JCT-3V Meeting; Jan. 11, 2014-Jan. 17, 2014; San Jose; (The Joint Collaborative Team on 3D Video Coding Extension Development of ISO/IEC JTC1/SC29/WG11 and ITU-T SG.16 ), No. JCT3V-G0037, Dec. 29, 2013 (Dec. 29, 2013), XP030131781, Url: http://phenix.int-evry.fr/jct2/.

\* cited by examiner

HYPOTHETICAL REFERENCE DECODER PARAMETERS FOR PARTITIONING SCHEMES IN VIDEO CODING

This application claims the benefit of U.S. Provisional Patent Application 61/987,463, filed May 1, 2014, and U.S. Provisional Patent Application 61/993,980, filed May 15, 2014, the entire content of each of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicates the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

A multi-view coding bitstream may be generated by encoding views, e.g., from multiple perspectives. Some three-dimensional (3D) video standards have been developed that make use of multi-view coding aspects. For example, different views may transmit left and right eye views to support 3D video. Alternatively, some 3D video coding processes may apply so-called multi-view plus depth coding. In multi-view plus depth coding, a 3D video bitstream may contain not only texture view components, but also depth view components. For example, each view may comprise one texture view component and one depth view component.

SUMMARY

In general, this disclosure describes techniques of describing video bitstream properties used to define conformance in terms of video bitstream partitions, and the video decoder capabilities required to decode video bitstreams so defined.

In one example, this disclosure describes a method of testing conformance to a video coding standard, the method comprising: obtaining, from a bitstream that comprises an encoded representation of video data, one or more syntax elements indicating one or more partitioning schemes for an output layer set, wherein: the bitstream comprises a plurality of layers, the output layer set consists of all layers of the plurality of layers or a proper subset of the plurality of layers; for each respective partitioning scheme of the one or more partitioning schemes: the respective partitioning scheme specifies a division of the output layer set into one or more partitions, wherein each layer in the output layer set belongs to exactly one partition in the respective partitioning scheme; and for each respective partitioning scheme of the one or more partitioning schemes: obtaining, from a Supplemental Enhancement Information (SEI) message in the bitstream or video usability information (VUI) in a video parameter set (VPS) in the bitstream, a respective set of syntax elements indicating hypothetical reference decoder (HRD) parameter sets for the respective partitioning scheme; and for each respective partition of the respective partitioning scheme, testing, based on the HRD parameter sets for the respective partitioning schemes, the respective partition for conformance to the video coding standard.

In another example, this disclosure describes a method of encoding video data, the method comprising: generating a bitstream that comprises an encoded representation of the video data, the bitstream comprising a plurality of layers, wherein generating the bitstream comprises: including, in the bitstream, one or more syntax elements indicating one or more partitioning schemes for an output layer set, wherein: the output layer set consists of all layers of the plurality of layers or a proper subset of the plurality of layers; for each respective partitioning scheme of the one or more partitioning schemes: the respective partitioning scheme specifies a division of the output layer set into one or more partitions, wherein each layer in the output layer set belongs to exactly one partition in the respective partitioning scheme; and for each respective partitioning scheme of the one or more partitioning schemes, including, in a Supplemental Enhancement Information (SEI) message in the bitstream or video usability information (VUI) in a video parameter set (VPS) in the bitstream, a respective set of syntax elements indicating hypothetical reference decoder (HRD) parameter sets for the respective partitioning scheme; and outputting the bitstream.

In another example, this disclosure describes a device that tests conformance to a video coding standard, the device comprising: one or more computer-readable storage media configured to store a bitstream that comprises an encoded representation of video data; and one or more processors configured to: obtain, from a bitstream that comprises an encoded representation of the video data, one or more syntax elements indicating one or more partitioning schemes for an output layer set, wherein: the bitstream comprises a plurality of layers, the output layer set consists of all layers of the plurality of layers or a proper subset of the plurality of layers; for each respective partitioning scheme of the one or more partitioning schemes: the respective partitioning scheme specifies a division of the output layer set into one or more partitions, wherein each layer in the output layer set belongs to exactly one partition in the respective partitioning scheme; and for each respective partitioning scheme of the one or more partitioning schemes: obtain, from a Supplemental Enhancement Information (SEI) message in the bitstream or video usability information (VUI) in a video parameter set (VPS) in the bitstream, a respective set of syntax elements indicating hypothetical reference decoder (HRD) parameter sets for the respective partitioning scheme; and for each respective partition of the respective partitioning scheme, test, based on the HRD parameter sets for the respective partitioning schemes, the respective partition for conformance to the video coding standard.

In another example, this disclosure describes a device for encoding video data, the device comprising: one or more computer-readable storage media configured to store the video data; and one or more processors configured to: generate a bitstream that comprises an encoded representation of the video data, the bitstream comprising a plurality of layers, wherein the one or more processors are configured such that, as part of generating the bitstream, the one or more processors include, in the bitstream, one or more syntax elements indicating one or more partitioning schemes for an output layer set, wherein: the output layer set consists of all layers of the plurality of layers or a proper subset of the plurality of layers; for each respective partitioning scheme of the one or more partitioning schemes: the respective partitioning scheme specifies a division of the output layer set into one or more partitions, wherein each layer in the output layer set belongs to exactly one partition in the respective partitioning scheme; and for each respective partitioning scheme of the one or more partitioning schemes, including, in a Supplemental Enhancement Information (SEI) message in the bitstream or video usability information (VUI) in a video parameter set (VPS) in the bitstream, a respective set of syntax elements indicating hypothetical reference decoder (HRD) parameter sets for the respective partitioning scheme; and output the bitstream.

In another example, this disclosure describes a device that tests conformance to a video coding standard, the device comprising: means for obtaining, from a bitstream that comprises an encoded representation of video data, one or more syntax elements indicating one or more partitioning schemes for an output layer set, wherein: the bitstream comprises a plurality of layers, the output layer set consists of all layers of the plurality of layers or a proper subset of the plurality of layers; for each respective partitioning scheme of the one or more partitioning schemes: the respective partitioning scheme specifies a division of the output layer set into one or more partitions, wherein each layer in the output layer set belongs to exactly one partition in the respective partitioning scheme; and for each respective partitioning scheme of the one or more partitioning schemes: means for obtaining, from a Supplemental Enhancement Information (SEI) message in the bitstream or video usability information (VUI) in a video parameter set (VPS) in the bitstream, a respective set of syntax elements indicating hypothetical reference decoder (HRD) parameter sets for the respective partitioning scheme; and for each respective partition of the respective partitioning scheme, means for testing, based on the HRD parameter sets for the respective partitioning schemes, the respective partition for conformance to the video coding standard.

In another example, this disclosure describes a device for encoding video data, the device comprising: means for generating a bitstream that comprises an encoded representation of the video data, the bitstream comprising a plurality of layers, wherein the means for generating the bitstream comprises: means for including, in the bitstream, one or more syntax elements indicating one or more partitioning schemes for an output layer set, wherein: the output layer set consists of all layers of the plurality of layers or a proper subset of the plurality of layers; for each respective partitioning scheme of the one or more partitioning schemes: the respective partitioning scheme specifies a division of the output layer set into one or more partitions, wherein each layer in the output layer set belongs to exactly one partition in the respective partitioning scheme; and for each respective partitioning scheme of the one or more partitioning schemes, including, in a Supplemental Enhancement Information (SEI) message in the bitstream or video usability information (VUI) in a video parameter set (VPS) in the bitstream, a respective set of syntax elements indicating hypothetical reference decoder (HRD) parameter sets for the respective partitioning scheme; and means for outputting the bitstream.

In another example, this disclosure describes a computer-readable storage medium including instructions stored thereon that when executed cause a device to test conformance to a video coding standard, wherein upon execution of the instructions the device is caused to: obtain, from a bitstream that comprises an encoded representation of video data, one or more syntax elements indicating one or more partitioning schemes for an output layer set, wherein: the bitstream comprises a plurality of layers, the output layer set consists of all layers of the plurality of layers or a proper subset of the plurality of layers; for each respective partitioning scheme of the one or more partitioning schemes: the respective partitioning scheme specifies a division of the output layer set into one or more partitions, wherein each layer in the output layer set belongs to exactly one partition in the respective partitioning scheme; and for each respective partitioning scheme of the one or more partitioning schemes: obtain, from a Supplemental Enhancement Information (SEI) message in the bitstream or video usability information (VUI) in a video parameter set (VPS) in the bitstream, a respective set of syntax elements indicating hypothetical reference decoder (HRD) parameter sets for the respective partitioning scheme; and for each respective partition of the respective partitioning scheme, test, based on the HRD parameter sets for the respective partitioning schemes, the respective partition for conformance to the video coding standard.

In another example, this disclosure describes a computer-readable storage medium including instructions stored thereon that when executed cause a device for encoding video data to: generate a bitstream that comprises an encoded representation of the video data, the bitstream comprising a plurality of layers, wherein, as part of causing the device to generate the bitstream, the instructions cause the device to: include, in the bitstream, one or more syntax elements indicating one or more partitioning schemes for an output layer set, wherein: the output layer set consists of all layers of the plurality of layers or a proper subset of the plurality of layers; for each respective partitioning scheme of the one or more partitioning schemes: the respective partitioning scheme specifies a division of the output layer set into one or more partitions, wherein each layer in the output layer set belongs to exactly one partition in the respective partitioning scheme; and for each respective partitioning scheme of the one or more partitioning schemes, include, in a Supplemental Enhancement Information (SEI) message in the bitstream or video usability information (VUI) in a video parameter set (VPS) in the bitstream, a respective set of syntax elements indicating hypothetical reference decoder (HRD) parameter sets for the respective partitioning scheme; and output the bitstream.

The details of one or more examples of the disclosure are set forth in the accompanying drawings and the description below. Other features, objects, and advantages will be apparent from the description, drawings, and claims.

DETAILED DESCRIPTION

Figure 1:
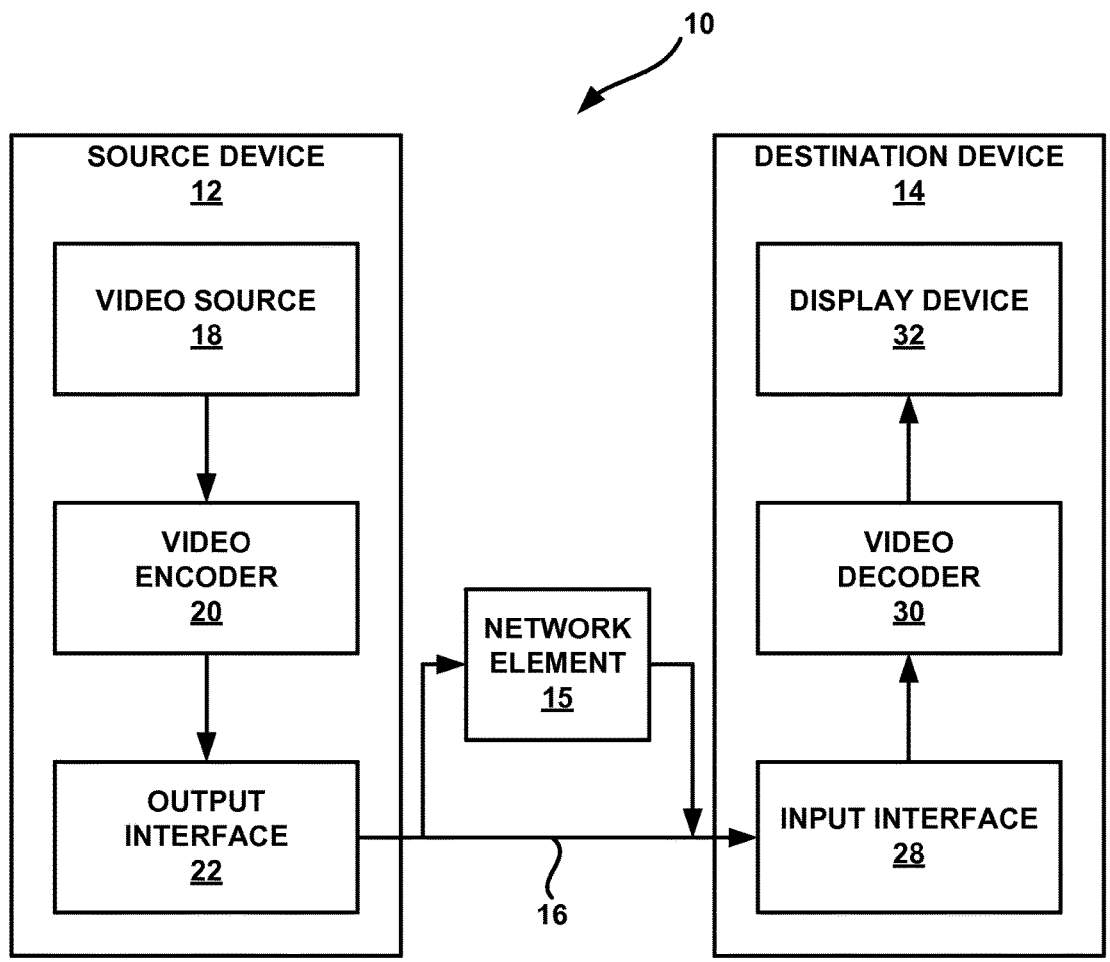
FIG. 1 is a block diagram illustrating an example video coding system that may utilize the techniques described in this disclosure.

A bitstream (i.e. a video bitstream) may comprise an encoded representation of video data. More specifically, the bitstream may comprise a series of Network Abstraction Layer (NAL) units. Each of the NAL units may include a NAL unit header and a Raw Byte Sequence Payload (RBSP). In multi-layer video coding, NAL units may correspond to various layers of video data. In scalable video coding, the layers may include a base layer and one or more enhancement layers. In multi-view coding, each of the layers may correspond to different views, such as different views of a video scene.

Certain video coding standards, such as High-Efficiency Video Coding (HEVC), define several different profiles, tiers, and levels. In general, a "profile" of a video coding standard is a subset of the features and tools present in the video coding standard. In other words, a profile defines what coding tools may be used. For instance, for a video encoder, a profile may be set of coding tools that the video encoder can use to generate coded bitstreams that conform the said profile. For a video decoder, a profile may mean the set of coding tools that the video decoder must have in order to be able to decode bitstreams said to conform to the said profile.

A level is a defined set of constraints on the values that may be taken by the syntax elements and variables of a video coding standard. A tier is a specified category of level constraints imposed on values of the syntax elements in the bitstream or values of variables, where the level constraints are nested within a tier and a decoder conforming to a certain tier and level would be capable of decoding all bitstreams that conform to the same tier or the lower tier of that level or any level below that level. Thus, a level of a tier is a specified set of constraints imposed on values of the syntax elements in the bitstream or variables used in decoding the bitstream.

Different video decoders may have different capabilities. For example, one video decoder may be able to decode bitstreams conforming to a first profile, but may not be able to decode bitstreams conforming to a second profile. In this example, another video decoder may be able to decode bitstreams conforming to the first profile and the second profile. For example, with scalable layers of video coding, the level of video quality that may be achieved can be scaled across layers such that some devices may only be capable of decoding and presenting a base level of video quality while other devices may be capable of decoding and presenting enhanced video quality. Also, scalable layers may allow for more reliable video data reception when channel bandwidth is limited, e.g., a limited bandwidth channel may still be sufficient for video data communication of the base layer and more robust bandwidth channels may allow for video data communication of base and enhancement layers. In general, if a first processor is able to decode bitstreams conforming to profiles, tiers, and levels that are a superset of profiles, tiers, and levels that can be decoded by a second processor, the first processor is more complex and therefore tends to be more expensive.

Similarly, with multi-view coding, multiple views may be decodable by some devices, while other devices may only have capabilities of decoding a limited number of views. Channel bandwidth constraints may also be more effectively utilized by multi-view coding such that a limited number of views are decodable when bandwidth is limited, and a larger number of views may be decodable when bandwidth allows.

In some instances, a video decoder comprises multiple hardware cores (e.g., processing units or processing modules). In other words, a video decoder may be built using a plurality of hardware cores. Each of the hardware cores may be capable of independently decoding at least low-level syntax elements of a bitstream. The different cores may be similar or different in their processing capabilities, but regardless, the presence of multiple cores may provide for processing advantages over single core decoders. In some examples, a video decoder comprising multiple hardware cores may be able to decode multiple portions of a bitstream in parallel. For instance, some processing cores may implement a single layer decoder. A single layer decoder may be able to decode a single layer of a bitstream, such as a base layer of scalable video or a particular view in multi-view video. In contrast, a multi-layer decoder may be able to decode multiple layers of a bitstream concurrently (i.e., in parallel). In one examples, a single hardware core is capable of decoding more than one layer.

Different hardware cores of a video decoder may have different capabilities. For example, one hardware core of a video decoder may be able to decode bitstreams conforming to a first profile, but not a second profile, while a second hardware core of a video decoder may be able to decode bitstreams conforming to the first profile and the second profile. A video decoder may have hardware cores having different capabilities in order to keep the overall cost of the video decoder as low as possible, given the intended purpose of the video decoder.

Typically, in instances where a video decoder comprises multiple hardware cores, the video decoder determines, based on profile, tier, and level information signaled in a bitstream, whether a most capable hardware core of the video decoder is able to decode the bitstream. If so, the video decoder determines that it is capable of decoding the bitstream. This process does not enable the video decoder to determine whether any of the less-capable hardware cores of the video decoder are able to assist in the process of decoding the bitstream. As a result, the less-capable hardware cores may be idle while the most capable hardware core decodes all of the bitstream. However, the less-capable hardware cores of the video decoder may in fact be able to decode particular layers of the bitstream in parallel with the most-capable hardware core of the video decoder. As a result, not using the less-capable hardware cores may unnecessarily prolong decoding times.

Some techniques of this disclosure may facilitate reductions in decoding times in video decoders having hardware cores with different capabilities. For instance, some techniques of this disclosure may decrease decoding times in video decoders built based on multiple single-layer decoders having different capabilities. This reduction in decoding times relative to more conventional techniques may be accomplished without changing the hardware cores themselves (e.g., without modifying the physical structures of the hardware cores). Additionally, when hardware cores that the same capabilities, some techniques of this disclosure may enable video decoders to decode more layers in parallel.

In accordance with one example technique of this disclosure, a video decoder may decode a bitstream that comprises an encoded representation of video data. In this example, the bitstream comprises a plurality of layers. As part of decoding the bitstream, the video decoder may obtain, from the bitstream, one or more syntax elements that indicate one or more partitioning schemes. For each respective partitioning scheme of the one or more partitioning schemes, the respective partitioning scheme specifies a respective set of disjoint partitions whose union forms an output layer set. Each respective partition of the respective set of disjoint partitions contains one or more of the layers. Hence, a partition may be a particular type of sub-bitstream of the bitstream. The output layer set may consist of all layers of the plurality of layers or a proper subset of the plurality of layers. Furthermore, the video decoder may decode each of the partitions of a particular partitioning scheme using different processing cores in a plurality of hardware cores, the particular partitioning scheme being one of the one or more partitioning schemes.

In some examples, for each respective partition of each respective partitioning scheme of the one or more partitioning schemes, the video decoder obtains, from the bitstream, a respective syntax element that indicates respective profile, tier, and level (PTL) information for the respective partition. In some instances, the video decoder may select, based on the PTL information for partitions of the partitioning schemes, a partitioning scheme from the one or more partitioning schemes. In some instances, the video decoder may receive the bitstream according to a particular partitioning scheme as determined by the network resources available. The video decoder may decode each respective partition of the particular partitioning scheme using a respective one of the hardware cores. Each respective one of the hardware cores may implement a respective single-layer decoder. In some instances, one hardware core of the video decoder may be capable of decoding more than one layer.

Additional techniques of this disclosure can provide for bitstream conformance testing using the bitstream partitions. For example, a video processing device (such as a video encoder, video decoder, or other device) may decode a bitstream that comprises an encoded representation of video data. The bitstream may comprise a plurality of layers. As part of decoding the bitstream, the video decoder may obtain, from the bitstream, one or more syntax elements indicating one or more partitioning schemes for an output layer set. In these types of examples, the output layer set may consist of all layers of the plurality of layers or a proper subset of the plurality of layers (e.g., not all layers of the plurality of layers). Furthermore, for each respective partitioning scheme of the one or more partitioning schemes, the respective partitioning scheme may specify a division of the output layer set into one or more partitions. Each layer in the output layer set may belong to exactly one partition in the respective partitioning scheme. For each respective partitioning scheme of the one or more partitioning schemes, the video decoder may obtain, from a Supplemental Enhancement Information (SEI) message in the bitstream or video usability information (VUI) in a video parameter set (VPS) in the bitstream, a respective set of syntax elements indicating hypothetical reference decoder (HRD) parameter sets for the partitioning scheme. In addition, for each respective partition of the partitioning scheme, the video processing device may test, based on the HRD parameter sets for the respective partitioning scheme, the respective partition for conformance to a video coding standard, such as MV-HEVC or SHVC.

In accordance with some techniques of this disclosure, a multi-layer video decoder may determine, based on a list of triplet entries, whether the multi-layer video decoder is capable of decoding (i.e., is configured to decode) a bitstream that comprises an encoded representation of the multi-layer video data. The number of triplet entries in the list may be less than or equal to a number of single-layer decoders in the multi-layer video decoder. Each respective triplet entry in the list of triplet entries indicates a profile, a tier, and a level that a respective single-layer decoder in the multi-layer video decoder is capable for decoding (i.e., is configured to decode). Based on the multi-layer video decoder being capable of decoding the bitstream, the multi-layer video decoder may decode the bitstream. In some examples, the video processing device may determine that the multi-layer decoder is capable of decoding the bitstream by determining that the bitstream specifies a partitioning scheme where the PTL information of each partition of the partitioning scheme indicates that the partition can be decoded by at least one of the single-layer decoders. This may enable a multi-layer video decoder having multiple single-layer decoders to determine whether the multi-layer video decoder is able to decode the bitstream.

FIG. 1 is a block diagram illustrating an example video coding system 10 that may utilize the techniques of this disclosure. As used herein, the term "video coder" refers generically to both video encoders and video decoders. In this disclosure, the terms "video coding" or "coding" may refer generically to video encoding or video decoding.

As shown in FIG. 1, video coding system 10 includes a source device 12, a destination device 14, and a network element 15. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses.

Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Network element 15 may receive encoded video data and output processed encoded video data. Network element 15 may be a media aware network element (MANE), content delivery network (CDN) device, or another type of device (e.g., computing device). Network device 15 may perform one or more techniques of this disclosure. For example, network device 15 may perform one or more bitstream conformance tests, in accordance with one or more techniques of this disclosure. Network element 15, source device 12, destination device 14, and other types of device that process video data may be considered video processing devices.

Destination device 14 may receive encoded video data from source device 12 via a channel 16. Channel 16 may comprise one or more media or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include a storage medium that stores encoded video data generated by source device 12. In this example, destination device 14 may access the storage medium, e.g., via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video data generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections may include wireless channels (e.g., Wi-Fi connections), wired connections (e.g., digital subscriber line (DSL), cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

FIG. 1 is merely an example and the techniques of this disclosure may apply to video coding settings (e.g., video encoding or video decoding) that do not necessarily include any data communication between the encoding and decoding devices. In other examples, data (e.g., video data) is retrieved from a local memory, streamed over a network, or the like. A video encoding device may encode and store data (e.g., video data) to memory, and/or a video decoding device may retrieve and decode data (e.g., video data) from memory. In many examples, the encoding and decoding is performed by devices that do not communicate with one another, but simply encode data to memory and/or retrieve and decode data (e.g., video data) from memory.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data. Thus, in some examples, source device 12 comprises a camera configured to capture video data.

Video encoder 20 may encode video data from video source 18. In some examples, source device 12 directly transmits the encoded video data to destination device 14 via output interface 22. In other examples, the encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Video decoder 30 may decode encoded video data. Display device 32 may display the decoded video data. Display device 32 may be integrated with or may be external to destination device 14. Display device 32 may comprise a variety of display devices, such as a liquid crystal display (LCD), a plasma display, an organic light emitting diode (OLED) display, or another type of display device.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data used to decode the compressed video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

In some examples, video encoder 20 and video decoder 30 operate according to a video compression standard, such as ISO/IEC MPEG-4 Visual and ITU-T H.264 (also known as ISO/IEC MPEG-4 AVC), including its Scalable Video Coding (SVC) extension, Multiview Video Coding (MVC) extension, and MVC-based 3DV extension. In some instances, any bitstream conforming to the MVC-based 3DV extension of H.264/AVC always contains a sub-bitstream that is compliant to the MVC extension of H.264/AVC. The latest joint draft of MVC is described in "Advanced video coding for generic audiovisual services," ITU-T Recommendation H.264, March 2010. Furthermore, there is an ongoing effort to generate a three-dimensional video (3DV) coding extension to H.264/AVC, namely AVC-based 3DV. In other examples, video encoder 20 and video decoder 30 may operate according to ITU-T H.261, ISO/IEC MPEG-1 Visual, ITU-T H.262 or ISO/IEC MPEG-2 Visual, ITU-T H.263, and ISO/IEC MPEG-4 Visual.

In other examples, video encoder 20 and video decoder 30 may operate according to the High Efficiency Video Coding (HEVC) standard developed by the Joint Collaboration Team on Video Coding (JCT-VC) of ITU-T Video Coding Experts Group (VCEG) and ISO/IEC Motion Picture Experts Group (MPEG). A draft of the HEVC standard, referred to as the "HEVC draft specification" is described in Bross et al., "High Efficiency Video Coding (HEVC) Defect Report 3," Joint Collaborative Team on Video Coding (JCT-VC) of ITU-T SG16 WP3 and ISO/IEC JTC1/SC29/WG11, 16$^{th}$ Meeting, San Jose, US, January 2014, document no. JCTVC-P1003_v1. The HEVC draft specification is available from http://phenix.it-sudparis.eu/jct/doc_end_user/documents/16_San%20Jose/wg11/JCTVC-P1003-v1.zip.

Furthermore, there are ongoing efforts to produce a scalable video coding extension for HEVC. The scalable video coding extension of HEVC may be referred to as SHEVC or SHVC. Additionally, a Joint Collaboration Team on 3D Video Coding (JCT-3C) of VCEG and MPEG is developing a 3DV standard based on HEVC. Part of the standardization efforts for the 3DV standard based on HEVC includes the standardization of a multi-view video codec based on HEVC (i.e., MV-HEVC). Another part of the standardization efforts for the 3DV standard based on HEVC includes the standardization of a 3D Video coding based on HEVC (i.e., 3D-HEVC). For 3D-HEVC, new coding tools, including those at the coding unit (CU) or prediction unit (PU) level, for both texture and depth views may be included and supported.

A recent Working Draft (WD) of MV-HEVC, referred to as MV-HEVC WD8 hereinafter, is available from http://phenix.it-sudparis.eu/jct2/doc_end_user/documents/8_Valencia/wg11/JCT3V-H1002-v1.zip. The scalable extension to HEVC, named SHVC, is also being developed by the JCT-VC. A recent Working Draft (WD) of SHVC, referred to as SHVC WD6 hereinafter, is available from http://phenix.it-sudparis.eu/jct/doc end_user/documents/17_Valencia/wg11/JCTVC-Q1008-v1.zip.

In HEVC and other video coding specifications, a video sequence typically includes a series of pictures. Pictures may also be referred to as "frames." A picture may include three sample arrays, denoted $S_L$, $S_{Cb}$, and $S_{Cr}$. $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

This disclosure may use the term "video unit" or "video block" or "block" to refer to one or more sample blocks and syntax structures used to code samples of the one or more blocks of samples. Example types of video units may include CTUs, CUs, PUs, transform units (TUs), macroblocks, macroblock partitions, and so on. In some contexts, discussion of PUs may be interchanged with discussion of macroblocks or macroblock partitions.

To generate a coded CTU, video encoder 20 may recursively perform quad-tree partitioning on the coding tree blocks of a CTU to divide the coding tree blocks into coding blocks, hence the name "coding tree units." A coding block is an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block. Video encoder 20 may generate predictive blocks (e.g., luma, Cb, and Cr predictive blocks) for prediction blocks (e.g., luma, Cb, and Cr prediction blocks) of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture that includes the PU.

After video encoder 20 generates predictive blocks (e.g., luma, Cb, and Cr predictive blocks) for one or more PUs of a CU, video encoder 20 may generate one or more residual blocks for the CU. For instance, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the residual blocks (e.g., the luma, Cb, and Cr residual blocks) of a CU into one or more transform blocks (e.g., luma, Cb, and Cr transform blocks). A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may have a luma transform block, a Cb transform block, and a Cr transform block. The luma transform block of the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms a transform block of a TU to generate a coefficient block for the TU. For instance, video encoder 20 may apply one or more transforms to a luma transform block of a TU to generate a luma coefficient block for the TU. A coefficient block may be a two-dimensional array of transform coefficients. A transform coefficient may be a scalar quantity.

Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. Thus, the bitstream comprises an encoded representation of video data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, different types of NAL unit may encapsulate different RBSPs for video parameter sets (VPSs), sequence parameter sets (SPSs), picture parameter sets (PPSs), coded slices, supplemental enhancement information (SEI), and so on. NAL units that encapsulate RBSPs for video coding data (as opposed to RBSPs for parameter sets and SEI messages) may be referred to as video coding layer (VCL) NAL units. In HEVC (i.e., non-multi-layer HEVC), an access unit may be a set of NAL units that are consecutive in decoding order and contain exactly one coded picture. In addition to the coded slice NAL units of the coded picture, the access unit may also contain other NAL units not containing slices of the coded picture. In some examples, the decoding of an access unit always results in a decoded picture. Supplemental Enhancement Information (SEI) contains information that is not necessary to decode the samples of coded pictures from VCL NAL units. An SEI RBSP contains one or more SEI messages.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks of TUs of the current CU. Video decoder 30 may perform inverse transforms on the coefficient blocks to reconstruct transform blocks of the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

The techniques of this disclosure are potentially applicable to multi-view coding and/or 3DV standards and specifications, including MV-HEVC and 3D-HEVC. In multi-view coding, such as that defined in MV-HEVC and 3D-HEVC, there may be multiple views of the same scene from different viewpoints. In the context of multi-view coding and scalable video coding, the term "access unit" may be used to refer to the set of pictures that correspond to the same time instance. In some instances, in the context of multi-view coding and scalable video coding, an access unit may comprise a set of NAL units that are associated with each other according to a specified classification rule, are consecutive in decoding order, and contain the VCL NAL units of all coded pictures associated with the same output time and their associated non-VCL NAL units. Thus, video data may be conceptualized as a series of access units occurring over time.

In 3DV coding, such as that defined in 3D-HEVC, a "view component" may be a coded representation of a view in a single access unit. A view component may contain a depth view component and a texture view component. A depth view component may be a coded representation of the depth of a view in a single access unit. A texture view component may be a coded representation of the texture of a view in a single access unit. In this disclosure, a "view" may refer to a sequence of view components associated with the same view identifier.

The texture view component and the depth view component within a set of pictures of a view may be considered as corresponding to one another. For example, the texture view component within a set of pictures of a view is considered as corresponding to the depth view component within the set of the pictures of the view, and vice-versa (i.e., the depth view component corresponds to its texture view component in the set, and vice-versa). As used in this disclosure, a texture view component that corresponds to a depth view component may be considered as the texture view component and the depth view component being part of a same view of a single access unit.

The texture view component includes the actual image content that is displayed. For example, the texture view component may include luma (Y) and chroma (Cb and Cr) components. The depth view component may indicate relative depths of the pixels in its corresponding texture view component. As one example, the depth view component may comprise a gray scale image that includes only luma values, but the luma values in a depth view component may represent a level of depth of a pixel or set of pixels, as opposed to a level of pixel intensity that would be conveyed by a luma component of a texture view. In other words, the depth view component may not convey any image content, but rather provide a measure of the relative depths of the pixels in the texture view component. The depth view component using only luma values (e.g., intensity values) to identify depth is provided for illustration purposes and should not be considered limiting. In other examples, any technique may be utilized to indicate relative depths of the pixels in the texture view component.

In multi-view coding and SVC coding, a bitstream may have a plurality of layers. In multi-view coding, each of the layers may correspond to a different view. A layer may be referred to as a "base layer" if a video decoder (e.g., video decoder 30) can decode pictures in the layer without reference to pictures in any other layer. A layer may be referred to as a "non-base layer" or a "dependent layer" if decoding of the layer is dependent on decoding of pictures in one or more other layers. When coding a picture in one of the non-base layers, a video coder (such as video encoder 20 or video decoder 30) may add a picture into a reference picture list if the picture is in a different view but within a same time instance (i.e., access unit) as the picture that the video coder is currently coding. Like other inter prediction reference pictures, the video coder may insert an inter-view prediction reference picture at any position of a reference picture list.

In SVC, layers other than the base layer may be referred to as "enhancement layers" and may provide information that enhances the visual quality of video data decoded from the bitstream. SVC can enhance spatial resolution, signal-to-noise ratio (i.e., quality) or temporal rate. In scalable video coding (e.g., SHVC), a "layer representation" may be a coded representation of a spatial layer in a single access unit. For ease of explanation, this disclosure may refer to view components and/or layer representations as "view components/layer representations" or simply "pictures."

To implement the layers, headers of NAL units may include nuh_reserved_zero_6 bits syntax elements, which may also be referred to as "nuh_layer_id" syntax elements. NAL units that have nuh_reserved_zero_6 bit syntax elements that specify different values belong to different layers of a bitstream. Thus, in multi-view coding (e.g. MV-HEVC), 3DV (e.g. 3D-HEVC), or SVC (e.g., SHVC), the nuh_reserved_zero_6 bits syntax element of a NAL unit specifies a layer identifier (i.e., a layer ID) of the NAL unit. In some examples, the nuh_reserved_zero_6 bits syntax element of a NAL unit is equal to 0 if the NAL unit relates to a base layer in multi-view coding (e.g., MV-HEVC), 3DV coding (e.g. 3D-HEVC), or SVC (e.g., SHVC). Data in a base layer of a bitstream may be decoded without reference to data in any other layer of the bitstream. If the NAL unit does not relate to a base layer in multi-view coding, 3DV, or SVC, the nuh_reserved_zero_6 bits syntax element of the syntax element may have a non-zero value. As indicated above, in multi-view coding and 3DV coding, different layers of a bitstream may correspond to different views.

Furthermore, some view components/layer representations within a layer may be decoded without reference to other view components/layer representations within the same layer. Thus, NAL units encapsulating data of certain view components/layer representations of a layer may be removed from the bitstream without affecting the decodability of other view components/layer representations in the layer. Removing NAL units encapsulating data of such view components/layer representations may reduce the frame rate of the bitstream. A subset of view components/layer representations within a layer that may be decoded without reference to other view components/layer representations within the layer may be referred to herein as a "sub-layer" or a "temporal sub-layer."

NAL units may include temporal_id syntax elements that specify temporal identifiers (i.e., TemporalIds) of the NAL units. The temporal identifier of a NAL unit identifies a sub-layer to which the NAL unit belongs. Thus, each sub-layer of a bitstream may have a different temporal identifier. In general, if the temporal identifier of a first NAL unit is less than the temporal identifier of a second NAL unit, the data encapsulated by the first NAL unit may be decoded without reference to the data encapsulated by the second NAL unit.

As briefly indicated above, NAL units may encapsulate RBSPs for video parameter sets (VPSs), sequence parameter sets (SPSs), picture parameter sets (PPSs). A VPS is a syntax structure comprising syntax elements that apply to zero or more entire coded video sequences (CVSs). An SPS is also a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

Parameter sets, such VPSs, SPSs, and PPSs may include extension syntax structures specific to extensions to the HEVC standard. For example, parameter sets may include extensions specific to SHVC, MV-HEVC, 3D-HEVC, and so on. The extension syntax structures may include syntax elements applicable to extensions to the HEVC standard. Table 1, below, shows a portion of VPS extension defined in SHVC WD6 and MV-HEVC WD8.

one or more layers in the set of layers are indicated to be output layers. As defined in SHVC WD6, an output layer is a layer of an output layer set that is output when TargetOptLayerSetIdx is equal to the index of the output layer set. TargetOptLayerSetIdx specifies a layer identifier list of an operation point in use and a set of target output layers. An operation point may refer to a subset (e.g., a proper subset) of NAL units in the bitstream. Furthermore, as defined in SHVC WD6, a target output layer is a layer that is to be output and is one of the output layers of the output layer set with index olsIdx such that TargetOptLayerSetIdx is equal to olsIdx. Thus, in general, the target output layer set may be a particular one of the output layer sets. Each layer of the target output layer set is output (e.g., provided as output of a video decoder). In some instances, video decoder 30 may decode a particular layer of a bitstream, but does not output decoded video data of the particular layer. Rather, video decoder 30 may use the decoded video data of the particular layer to decode video data of layers that are in the target output layer set.

In addition, the portion of the VPS extension defined in Table 1 includes syntax elements defining one or more profile, tier, and level (PTL) syntax structures. Each PTL syntax structure specifies a profile, tier, and level for each

TABLE 1

| | Descriptor |
|---|---|
| vps_extension( ) { | |
|     avc_base_layer_flag | u(1) |
|     ... | u(1) |
|     vps_num_profile_tier_level_minus1 | ue(v) |
|     for( ptlIdx = 1; ptlIdx <= vps_num_profile_tier_level_minus1; ptlIdx ++ ) | |
|     { | |
|         vps_profile_present_flag[ ptlIdx ] | u(1) |
|         profile_tier_level( vps_profile_present_flag[ ptlIdx ], vps_max_sub_layers_minus1 ) | |
|     } | |
|     ... | |
|     for( i = 1; i < NumOutputLayerSets; i++ ) { | |
|         if( i > vps_num_layer_sets_minus1 ) | |
|             output_layer_set_idx_minus1[ i ] | u(v) |
|         if( i > vps_num_layer_sets_minus1 \|\| defaultTargetOutputLayerIdc = = 2 ) | |
|             for( j = 0; j < NumLayersInIdList[ LayerSetIdxForOutputLayerSet[ i ] ]; j++ ) | |
|                 output_layer_flag[ i ][ j ] | u(1) |
|         profile_level_tier_idx[ i ] | u(v) |
|         if( NumOutputLayersInOutputLayerSet[ i ] = = 1 && NumDirectRefLayers[ OlsHighestOutputLayerId[ i ] ] > 0 ) | |
|             alt_output_layer_flag[ i ] | u(1) |
|     } | |
|     ... | |
|     vps_vui_present_flag | |
|     if( vps_vui_present_flag ) { | |
|         while( !byte_aligned( ) ) | |
|             vps_vui_alignment_bit_equal_to_one | u(1) |
|         vps_vui( ) | |
|     } | |
| } | |

In the example of Table 1, above, and other syntax tables of this disclosure, syntax elements with type descriptor ue(v) may be variable-length unsigned integers encoded using $0^{th}$ order exponential Golomb (Exp-Golomb) coding with left bit first. In the example of Table 1 and the following tables, syntax elements having descriptors of the form u(n), where n is a non-negative integer, are unsigned values of length n.

The portion of the VPS extension defined in Table 1 includes syntax elements defining one or more output layer sets. An output layer set is a set of layers consisting of the layers of one of the layer sets specified in the VPS, where coded video sequence. As further shown in Table 1, the VPS extension includes profile_level_tier_idx syntax elements that identify PTL syntax structures applicable to respective output layer sets. In this way, the VPS extension specifies PTL information for each of the output layer sets.

In general, a "profile" is a subset of the features and tools present in a video coding standard (e.g., HEVC or an extension thereof). Within the bounds imposed by a given profile it is still possible to require a very large variation in the performance of encoders and decoders depending upon the values taken by syntax elements in the bitstream such as the specified size of the decoded pictures. In many applications, it may be neither practical nor economic to implement a decoder capable of dealing with all hypothetical uses of the syntax within a particular profile. In order to deal with this problem, "tiers" and "levels" are specified within each profile.

In some examples, a level is a defined set of constraints on the values that may be taken by the syntax elements and variables of a video coding standard (e.g., HEVC or an extension thereof). Furthermore, in some examples, a tier is a specified category of level constraints imposed on values of the syntax elements in the bitstream or values of variables, where the level constraints are nested within a tier and a decoder conforming to a certain tier and level would be capable of decoding all bitstreams that conform to the same tier or the lower tier of that level or any level below it. Thus, a level of a tier is a specified set of constraints imposed on values of the syntax elements in the bitstream or values of variables. These constraints may be simple limits on values. Alternatively, they may take the form of constraints on arithmetic combinations of values (e.g., picture width multiplied by picture height multiplied by number of pictures decoded per second). A level specified for a lower tier is more constrained than a level specified for a higher tier. In some contexts, the term "level" may also be used to refer to the value of a transform coefficient prior to scaling.

As further shown in Table 1, above, the VPS extension may include a vps_vui( ) syntax structure. The vps_vui( ) syntax structure contains video usability information (VUI) parameters. Paragraph F.7.3.2.1.4 of SHVC WD6 describes the syntax of a vps_vui( ) syntax structure. As specified in the HEVC draft specification, VUI parameters are not required for constructing the luma or chroma samples by the decoding process. Conforming decoders are not required to process this information for output order conformance to this Specification (see Annex C for the specification of output order conformance). Some VUI parameters are required to check bitstream conformance and for output timing decoder conformance. In some instances, VUI parameters may also be specified in SPSs.

A vps_vui( ) syntax structure may include a vps_vui_bsp_hrd_parameters( ) syntax structure. The vps_vui_bsp_hrd_parameters( ) syntax structure includes syntax elements that specify hypothetical reference decoder (HRD) parameters for bitstream partitions. As defined in SHVC WD6, a bitstream partition is a sequence of bits, in the form of a NAL unit stream or a byte stream, that is a subset of a bitstream according to a partitioning.

At least some video coding standards specify video buffering models. In H.264/AVC and HEVC, a buffering model is referred to as a "hypothetical reference decoder" or "HRD." In the HEVC draft specification, the HRD is described in Annex C. The HRD describes how data is to be buffered for decoding and how decoded data is buffered for output. For instance, the HRD describes the operation of a coded picture buffer ("CPB"), a decoded picture buffer ("DPB"), and a video decoding process. The CPB is a first-in first-out buffer containing access units in a decoding order specified by HRD. The DPB is a buffer holding decoded pictures for reference, output reordering, or output delay specified by the HRD. The behaviors of the CPB and DPB may be mathematically specified. The HRD may directly impose constraints on timing, buffer sizes, and bit rates. Furthermore, the HRD may indirectly impose constraints on various bitstream characteristics and statistics.

In H.264/AVC and HEVC, bitstream conformance and decoder conformance are specified as parts of the HRD specification. In other words, the HRD model specifies tests to determine whether a bitstream conforms to a standard and tests to determine whether a decoder conforms to the standard. Though the HRD is named as some kind of decoder, video encoders typically use the HRD to guarantee bitstream conformance, while video decoders typically do not need the HRD.

H.264/AVC and HEVC both specify two types of bitstream or HRD conformance, namely Type I and Type II. A Type I bitstream is a NAL unit stream containing only the VCL NAL units and filler data NAL unit for all access units in the bitstream. In at least some examples, a NAL unit stream is a sequence of NAL units. A Type II bitstream is a NAL unit stream that contains, in addition to the VCL NAL units and filler data NAL units for all access units in the bitstream, at least one of the following: additional non-VCL NAL units other than filler data NAL units; and all leading_zero_8 bits, zero_byte, start_coded_prefix_one_3 bytes, and trailing_zero_8 bits syntax elements that form a byte stream from the NAL unit stream.

When a device performs a bitstream conformance test that determines whether a bitstream conforms to a video coding standard, the device may select an operation point of the bitstream. The device may then determine a set of HRD parameters applicable to the selected operation point. The device may use the set of HRD parameters applicable to the selected operation point to configure the behavior of the HRD. More particularly, the device may use the applicable set of HRD parameters to configure the behaviors of particular components of the HRD, such as a hypothetical stream scheduler (HSS), the CPB, a decoding process, the DPB, and so on. Subsequently, the HSS may inject coded video data of the bitstream into the CPB of the HRD according to a particular schedule. Furthermore, the device may invoke a decoding process that decodes the coded video data in the CPB. The decoding process may output decoded pictures to the DPB. As the device moves data through the HRD, the device may determine whether a particular set of constraints remains satisfied. For example, the device may determine whether an overflow or underflow condition occurs in the CPB or DPB while the HRD is decoding the operation point of the selected operation point. The device may select and process each operation point of the bitstream in this manner. If no operation point of the bitstream causes the constraints to be violated, the device may determine that the bitstream conforms to the video coding standard.

Both H.264/AVC and HEVC specify two types of decoder conformance, namely output timing decoder conformance and output order decoder conformance. A decoder claiming conformance to a specific profile, tier and level is able to successfully decode all bitstreams that conform to the bitstream conformance requirements of a video coding standard, such as HEVC.

When a device performs a decoder conformance test to determine whether a decoder under test (DUT) conforms to a video coding standard, the device may provide, to both the HRD and the DUT, a bitstream that conforms to the video coding standard. The HRD may process the bitstream in the manner described above with regard to the bitstream conformance test. The device may determine that the DUT conforms to the video coding standard if the order of decoded pictures output by the DUT matches the order of decoded pictures output by the HRD. Moreover, the device may determine that the DUT conforms to the video coding standard if the timing with which the DUT outputs decoded pictures matches the timing with which the HRD outputs the decoded pictures.

In the H.264/AVC and HEVC HRD models, decoding or CPB removal may be access unit based. That is, the HRD is assumed to decode complete access units at one time and remove complete access units from the CPB. Furthermore, in the H.264/AVC and HEVC HRD models, it is assumed that picture decoding is instantaneous. Video encoder 20 may signal, in picture timing SEI messages, decoding times to start decoding of access units. In practical applications, if a conforming video decoder strictly follows the decoding times signalled to start decoding of access units, the earliest possible time to output a particular decoded picture is equal to the decoding time of that particular picture plus the time needed for decoding that particular picture. However, in the real world, the time needed for decoding a picture cannot be equal to zero.

HRD parameters may control various aspects of the HRD. In other words, the HRD may rely on the HRD parameters. The HRD parameters may include an initial CPB removal delay, a CPB size, a bit rate, an initial DPB output delay, and a DPB size. Video encoder 20 may signal these HRD parameters in a hrd_parameters( ) syntax structure specified in a video parameter set (VPS) and/or a sequence parameter set (SPS). Individual VPSs and/or SPSs may include multiple hrd_parameters( ) syntax structures for different sets of HRD parameters. In some examples, video encoder 20 may signal HRD parameters in buffering period SEI messages or picture timing SEI messages.

An operation point of a bitstream is associated with a set of layer identifiers (i.e., a set of nuh_reserved_zero_6 bits values, which are also known as nuh_layer_id values) and a temporal identifier. An operation point may include each NAL unit that is associated with the operation point. An operation point may have a different frame rate and/or bit rate than an original bitstream. This is because the operation point may not include some pictures and/or some of the data of the original bitstream. Hence, if video decoder 30 were to remove data from the CPB and/or the DPB at a particular rate when processing the original bitstream and if video decoder 30 were to remove data from the CPB and/or the DPB at the same rate when processing an operation point, video decoder 30 may remove too much or too little data from the CPB and/or the DPB. Accordingly, video encoder 20 may signal different sets of HRD parameters for different operation points. For instance, video encoder 20 may include, in a VPS, multiple hrd_parameters( ) syntax structures that include HRD parameters for different operation points.

Table 2, below, is an example syntax for a hrd_parameters( ) syntax structure in HEVC.

TABLE 2

| HRD Parameters | Descriptor |
|---|---|
| hrd_parameters( commonInfPresentFlag, MaxNumSubLayersMinus1 ) { | |
|   if( commonInfPresentFlag ) { | |
|     timing_info_present_flag | u(1) |
|     if( timing_info_present_flag ) { | |
|       num_units_in_tick | u(32) |
|       time_scale | u(32) |
|     } | |
|     nal_hrd_parameters_present_flag | u(1) |
|     vcl_hrd_parameters_present_flag | u(1) |
|     if( nal_hrd_parameters_present_flag \|\| | |

TABLE 2-continued

| HRD Parameters | Descriptor |
|---|---|
|     vcl_hrd_parameters_present_flag ){ | |
|       sub_pic_cpb_params_present_flag | u(1) |
|       if( sub_pic_cpb_params_present_flag ) { | |
|         tick_divisor_minus2 | u(8) |
|         du_cpb_removal_delay_length_minus1 | u(5) |
|       } | |
|       bit_rate_scale | u(4) |
|       cpb_size_scale | u(4) |
|       initial_cpb_removal_delay_length_minus1 | u(5) |
|       cpb_removal_delay_length_minus1 | u(5) |
|       dpb_output_delay_length_minus1 | u(5) |
|     } | |
|   } | |
|   for( i = 0; i <= MaxNumSubLayersMinus1; i++ ) { | |
|     fixed_pic_rate_flag[ i ] | u(1) |
|     if( fixed_pic_rate_flag[ i ] ) | |
|       pic_duration_in_tc_minus1[ i ] | ue(v) |
|     low_delay_hrd_flag[ i ] | u(1) |
|     cpb_cnt_minus1[ i ] | ue(v) |
|     if( nal_hrd_parameters_present_flag ) | |
|       sub_layer_hrd_parameters( i ) | |
|     if( vcl_hrd_parameters_present_flag ) | |
|       sub_layer_hrd_parameters( i ) | |
|   } | |
| } | |

In some examples, video decoder 30 comprises a plurality of processing cores. Each of the processing cores comprises an independent processing unit, such as an ASIC or microprocessor. Each of the processing cores may implement a single-layer decoder. A single-layer decoder is a video coder capable of decoding NAL units belonging to a single layer of a bitstream. In such examples, because video decoder 30 comprises multiple processing cores, and thus multiple single-layer decoders, video decoder 30 may be able to decode multiple layers in parallel. In some instances, an individual hardware core of video decoder 30 may be capable of decoding more than one layer.

Different processing cores may have different capabilities. For instance, different processing cores may be able to decode video data belonging to different profiles, tiers, or levels. For example, a first processing core of video decoder 30 may be able to process video data belonging to a first level, but not a second level. In this example, a second processing core of video decoder 30 may be able to process video data belonging to the first level and the second level. In general, processing cores capable of decoding video data belonging to higher profiles, tiers, and levels are more complex and therefore more expensive than processing cores capable only of decoding video data belonging to lower profiles, tiers, and levels. Accordingly, a manufacturer of video decoder 30 may elect to include in video decoder 30 processing cores having the lowest capabilities suitable for handling a desired task.

Wang et al., "MV-HEVC/SHVC HLS: On level definition," Joint Collaborative Team on Video Coding (JCT-VC) of ITU-T SG 16 WP 3 and ISO/IEC JTC 1/SC 29/WG 11 17th Meeting: Valencia, ES, 27 Mar.-4 Apr. 2014, document no. JCTVC-Q0145 (hereinafter, "JCTVC-Q0145") describes several problems related to the levels definitions in SHVC.

First, if more than 4 signal-to-noise ratio (SNR) layers of 720p resolution (or equivalent number of luma pixels e.g. more layers with combined spatial and SNR layers) are needed, then Level 5 or above would have to be used. Consequently, the value of CtbSizeY shall be equal to 32 or 64 (per item e of the general limits). For resolution like 720p or lower, this restriction disallows the use of smaller coding tree block sizes such as 16×16 and can therefore result in sub-optimal coding efficiency.

Second, if an SHVC decoder is implemented in a way that consists of 4 cores of HEVC Level 3.1 decoders, and is able to decode 4 SNR layers of 720p, per the current level definition, it would have to be said to be conforming to Level 4 or above. Consequently, the decoder may need to be able to decode any Level 4 bitstreams. However, with only high-level syntax changes (i.e. no changes to the hardware cores), such a decoder would not be able to decode an SHVC Level 4 bitstream with 2 SNR layers of 1080p resolution.

Third, if an SHVC decoder is not implemented by reusing multiple existing HEVC decoder cores but is implemented in a way that can decode both a single-layer HEVC bitstream of 1080p and a two-layer SHVC bitstream of 720p, according to the current level definition it would labeled as a Level 3.1. However, then the expression of the other capability is missing.

Fourth, if an SHVC decoder is implemented in a way that consists of 4 cores of HEVC 3.1 decoders to be able to decode 4 SNR layers of 720p, per the current level definition, it would be said to be conforming to Level 4 or above. Consequently, each enhancement-layer picture can have more than 3 tile rows and more than 3 tile columns, e.g. 5 tile rows and 5 tile columns, each tile with width of 256 luma samples and height of 144 luma samples. However, this would go beyond the Level 3.1 limits and consequently the decoder cores for decoding the enhancement layers would have problems.

Fifth, all items in subclause A.4.1 of the HEVC draft specification are currently specified to be applied to each layer. However, some of these items are not directly applicable to each layer. For item d on DPB size, the SPS syntax element is not applicable for enhancement layers. In addition, the DPB in the SHVC WD6 is a shared-sub-DPB design, thus item d cannot be directly applied to each layer. For items h and i on CPB size, for bitstream-specific CPB operations, the parameter cannot be applied to each layer.

Sixth, bitstream-specific restrictions on CPB size (by items h and i in subclause A.4.1 of the HEVC draft specification) are needed. However, the items h and i in subclause A.4.1 of the HEVC draft specification cannot be directly applied on bitstream level, because if directly applied, the same CPB size limit for single-layer bitstreams would also be the limit for multi-layer bitstreams. This is not scalable to the number of layers and would only allow for low picture quality when there are many layers.

Seventh, the restrictions by items b, c, d, g, h, i, and j in subclause A.4.2 of the HEVC draft specification are currently specified to be layer-specific only. However, bitstream-specific restriction by these items should be specified, regardless of whether their layer-specific counterparts are specified.

JVTVC-Q0145 proposed an approach to define levels and decoder capabilities as well as other changes to solve the above issues. The design in JCTVC-Q0145 is associated with at least the following problems. First, the design is sub-optimal for SHVC/MV-HEVC decoders that each is built based on multiple HEVC single-layer decoders without changing the hardware cores (e.g., without modifying the capabilities of the hardware cores) where the multiple HEVC single-layer decoders are of different capabilities, e.g. different profiles, tiers, or levels. Second, levels may be defined in terms of restrictions. MV-HEVC WD8 and SHVC WD6 define many of these restrictions in terms of the syntax elements or variables having or not having particular values when decoding a bitstream. In other words, some of level restrictions (e.g. bit rate and sample rate) are specified to be bitstream-specific. However, to enable one HEVC single-layer decoder to be part of an SHVC/MV-HEVC decoder without changing the hardware core and to decode a subset of the layers (i.e. one or more layers, but not all the layers of an output layer set), such level restrictions may need to be specific to the subset of the layers.

An overview of various features according to various techniques of this disclosure is provided below. Some detailed implementations according to one or more examples of this disclosure are provided in later sections of this disclosure. Some of the features noted below may be applied independently and some of the features noted below may be applied in combination as would be recognized by one of skill in the art.

One example technique of this disclosure provides for signaling of one or more partitioning schemes of layers into partitions for each output layer set, with each partitioning scheme containing a set of disjoint partitions whose union forms the output layer set and each partition containing one or more layers. In other words, each partitioning scheme of an output layer specifies a different way of dividing the layers of the output layer set into non-overlapping partitions. In some examples, partitions are associated with output layer sets instead of layer sets.

In some examples, a partitioning scheme and a partition unit are defined as follows: An output layer set may have one or more partitioning schemes. A partitioning scheme of an output layer set divides layers in the output layer set into one or more partitions. Each layer in an output layer set shall belong to exactly one partition in a partitioning scheme.

Thus, in one example, video encoder 20 generates a bitstream that comprises an encoded representation of video data. As part of generating the bitstream, video encoder 20 includes, in the bitstream, one or more syntax elements indicating one or more partitioning schemes. For each respective partitioning scheme of the one or more partitioning schemes, the respective partitioning scheme specifies a respective set of disjoint partitions whose union forms an output layer set. In this example, each respective partition of the respective set of disjoint partitions contains one or more layers, the output layer set consists of all layers of the plurality of layers or a proper subset of the plurality of layers. Furthermore, video encoder 20 outputs the bitstream.

In a similar example, video decoder 30 decodes a bitstream that comprises an encoded representation of video data. In this example, the bitstream comprises a plurality of layers. As part of decoding the bitstream in this example, video decoder 30 obtains, from the bitstream, one or more syntax elements indicating one or more partitioning schemes. In some examples, video decoder 30 decodes each of the partitions of a particular partitioning scheme using different processing cores in a plurality of hardware cores, the particular partitioning scheme being one of the one or more partitioning schemes.

Furthermore, in some examples, video encoder 20 may include, in a bitstream, syntax elements indicating a plurality of output layer sets. For each respective output layer set of the plurality of output layer sets, video encoder 20 may include, in the bitstream, syntax elements indicating one or more partitioning schemes for the respective output layer set. In a similar example, video decoder 30 may obtain, from the bitstream, syntax elements indicating a plurality of output layer sets, the plurality of output layers sets including the first output layer set. In this example, for each respective output layer set of the plurality of output layer sets, video decoder 30 may obtain, from the bitstream, syntax elements indicating one or more partitioning schemes for the respective output layer set.

In accordance with some examples of this disclosure, the terms "partitioning scheme" and "partition unit" have the following definitions:

partitioning scheme: A division of layers in an output layer set into one or more partitions such that each layer in the output layer set is included in exactly one partition of the partitioning scheme and each partition of the partitioning scheme contains one or more layers.

partition unit: A sub set of access unit containing a set of NAL units according to a partitioning scheme.

As indicated above, a VPS extension may specify respective PTL information for each respective output layer set. For instance, the VPS extension may include, for each respective output layer set, a profile_level_tier_idx syntax element for the respective output layer set that identifies a PTL syntax structure for the respective output layer set. The PTL syntax structure for the respective output layer set specifies the PTL information for the respective output layer set.

Because video decoder 30 may use the PTL information of an output layer set to determine whether video decoder 30 is able to decode the output layer set, the PTL information of the output layer set typically specifies the lowest profile, tier, and level needed to decode the output layer set as a whole. However, the profile, tier, and level of some partitions of the output layer set may be lower than the profile, tier, and level of the output layer set as a whole. In other words, the profile, tier, and level of the output layer set may be the highest profile, tier, and level of the partition in the partitioning scheme of the output layer set, where each of the layers of the output layer set belong to one partition.

Hence, when different partitions of an output layer set have different PTL information, the PTL information for the output layer set may not be sufficient to express the diversity of PTL information of the partitions of the output layer set. One or more techniques of this disclosure can provide for the signaling of a profile, a tier, and a level for each partition. For instance, for each respective partition of each respective partitioning scheme signaled in a bitstream, video encoder 20 may include, in the bitstream, profile, tier, and level (PTL) information for the respective partition. Similarly, for each respective partition of each respective partitioning scheme signaled in a bitstream, video decoder 30 may obtain, from the bitstream, a respective syntax element (e.g., profile_level_tier_partition_idx) that indicates respective PTL information for the respective partition.

In some examples, video decoder 30 determines, based on the PTL information for partitions of the partitioning schemes, a partitioning scheme from the one or more partitioning schemes. Furthermore, in some examples, the partitioning scheme is determined based on the conditions of the network that is used to send the bitstream to the decoder. Video decoder 30 may decode each respective partition of the determining partitioning scheme using a respective hardware core. Each of the hardware cores may implement a respective single-layer decoder. In some examples, individual ones of the hardware cores decode more than one layer (e.g., implement a multi-layer decoder). Furthermore, different hardware cores may have different capabilities. For instance, at least a first hardware core of a plurality of hardware cores of video decoder 30 may support a different profile, tier, or level from a second hardware core of the plurality of hardware cores of video decoder 30. Thus, in one example, video decoder 30 may comprise a first hardware core and a second hardware core. In this example, the first hardware core may implement a level 3 decoder (i.e., a decoder capable of decoding HEVC Level 3 and below) and the second hardware core may implement a level 2 decoder (i.e., a decoder capable of decoding HEVC Level 2 and below). In this example, if the PTL information of a first partition indicates that the first partition can be decoded by a level 3 or higher decoder and if the PTL information indicates that a second partition can be decoded by a level 2 or higher decoder, video decoder 30 may use the first hardware core to decode the first partition and may use the second hardware core to decode the second partition. In some instances, when a multi-layer video decoder that includes one of more hardware cores to decode the partitions, and at least one of the decoder cores is conformant to one of scalable profiles (e.g. Scalable Main or Scalable Main 10) specified, capability to perform resampling or upsampling of pictures may be included. This resampling capability may be implemented in each core that is capable of decoding a scalable profile, or implemented as common block in the multi-layer decoder.

As briefly described above, video encoder 20 may include, in a VPS, syntax elements identifying output layer sets. Thus, output layer sets may be signaled in a VPS. In some examples, output layer sets may also be signaled by an external means. The external means may be some mechanism other than the video bitstream. Thus, an output layer set signaled by an external means and comprising output layers of a bitstream is not necessarily signaled in the bitstream.

In accordance with one or more techniques of this disclosure, for each respective partitioning scheme of each output layer set, a VPS VUI or SEI message of a bitstream may identify an HRD parameter set for the respective partitioning scheme. Thus, in some examples of this disclosure, the HRD parameters for each partitioning scheme for each output layer set signalled in the VPS or by external means are signalled in the VPS VUI or in SEI messages. Because HRD parameter sets are identified for each partitioning scheme, video decoder 30 or another device may be able to use the HRD parameters for the partitioning scheme to test whether the bitstream is a conforming bitstream when partitioned according to the partitioning scheme.

In one such example, video encoder 20 generates a bitstream that comprises an encoded representation of the video data. In this example, the bitstream comprises a plurality of layers. As part of generating the bitstream in this example, video encoder 20 includes, in the bitstream, one or more syntax elements indicating one or more partitioning schemes for an output layer set. In this example, the output layer set consists of all layers of the plurality of layers or a proper subset of the plurality of layers. For each respective partitioning scheme of the one or more partitioning schemes, the respective partitioning scheme specifies a division of the output layer set into one or more partitions, wherein each layer in the output layer set belongs to exactly one partition in the respective partitioning scheme. Furthermore, as part of generating the bitstream in this example, video encoder 20 may, for each respective partitioning scheme, include, in a SEI message in the bitstream or VUI in a VPS in the bitstream, a respective set of syntax elements indicating HRD parameter sets for the respective partitioning scheme. Video encoder 20 may output the bitstream.

In a similar example, a video processing device, such as video encoder 20 or video decoder 30, may decode a bitstream that comprises an encoded representation of the video data. In this example, the bitstream comprises a plurality of layers. As part of decoding the bitstream in this example, the video processing device obtains, from the bitstream, one or more syntax elements indicating one or more partitioning schemes for an output layer set. Additionally, for each respective partitioning scheme, video decoder 30 may obtain, from a SEI message in the bitstream or video usability information (VUI) in a VPS in the bitstream, a respective set of HRD parameter sets for the respective partitioning scheme. For each respective partitions of the respective partitioning scheme, the video processing device tests, based on the HRD parameters for the respective partitioning scheme, the respective partition for conformance to a video coding standard.

In at least some standards documents, such as SHVC WD6, MV-HEVC WD8, and the HEVC draft specification, profiles, tiers, and levels are defined in term of level limits and restrictions. A level limit may specify a limit on the value of a syntax element or variable. A restriction may specify a requirement or constraint. For example, JCTV3V-H1002 defines a "Stereo Main" profile and includes, among several other restrictions, a restriction requiring the bitstream to contain one layer with nuh_layer_id equal to i for which ViewScalExtLayerFlag[i] is equal to 1. Many of the level limits and restrictions specified in SHVC WD6, MV-HEVC WD8, and the HEVC draft specification are applicable to bitstreams. For instance, Paragraph G.11.1.2 of MV-HEVC WD8 describes the "Stereo Main" profile and specifies, with emphasis added, "Bitstreams conforming to the Stereo Main profile shall obey the following constraints . . . ."

However, in some examples of this disclosure, different bitstream partitions may have different PTL information. To support different bitstream partitions having different PTL information, the definitions of the level limits and restrictions may be expressed in terms of partitions instead of bitstreams. Thus, in accordance with some example techniques of this disclosure, all level limits and restrictions, except for the three on picture width, picture height, and sub-decoded picture buffer (DPB) size that are naturally layer specific, are specified to be partition specific. For instance, all level limits and restrictions of a profile, tier, or level, except for limits and restrictions on picture width, picture height, and sub-DPB size, are defined to be partition specific.

As noted above, sub-DPB size restrictions are naturally layer specific. To elaborate, the DPB may be virtually split in to sub-DPBs. Pictures of each layer are stored in a separate sub-DPB and each sub-DPB contains one layer. For example, an output layer set containing two layers, the DPB may be split into two sub-DPBs, with the first sub-DPB containing the first layer and the second sub-DPB containing the second layer. Instead of specifying the DPB size as a total, the sub-DPB size (that required for each layer) is specified in the bitstream. In such examples, the level limits indirectly put some restrictions on the overall DPB size.

In accordance with one or more techniques of this disclosure, one or more additional restrictions are introduced. One possible restriction, for example, is that for each output layer set, there shall be only one partitioning scheme that contains only one partition and that partition contains all layers in the output layer set. Each partitioning scheme is giving flexibility of a delivery scheme, i.e., which layers can be delivered together. When all layers are in one partition, the only way you can have different delivery schemes is by having different bit rates, for example. As a result, this constraint would help reduce some additional syntax.

In another example restriction, the sum of the picture sizes of a partition is restricted to be less than the maximum luma samples specified for the level of the partition. This restriction may ensure that if one partition with multiple layers is decoded by a single core, the overall DPB sizes of the current core are not exceeded. Moreover, this restriction may ensure that the total size of pictures of all layers does not exceed the size of picture of one layer that may have been decodable by the single-layer decoder. This restriction may enable easier extension of single-layer cores for multi-layer purposes (e.g. without having to potentially add additional memory).

In another example restriction, the signalled triplets of profile, tier and level associated with the output layer set is also associated with the partition that contains all layers in the output layer set.

Furthermore, in accordance with an example technique of this disclosure, a decoder's decoding capability is expressed as conforming to a list of triplets of profile, tier and level. In some examples, the number of entries in the list indicates the number of single-layer decoders used to build the multi-layer decoder, and each triplet of profile, tier and level indicates the profile, tier and level of one of the single-layer decoders.

Thus, in one example, a video processing device, such as video decoder 30 or another device, may determine, based on a list of triplet entries, whether a multi-layer video decoder (e.g., video decoder 30) is capable of decoding a bitstream that comprises an encoded representation of the multi-layer video data. The number of triplet entries in the list may be less than or equal to a number of single-layer decoders in the multi-layer video decoder. Each respective triplet entry in the list of triplet entries indicates a profile, a tier, and a level for a respective single-layer decoder in the multi-layer video decoder. In some examples, the video processing device may determine that the multi-layer decoder is capable of decoding the bitstream by determining that the bitstream specifies a partitioning scheme where the PTL information of each partition of the partitioning scheme indicates that the partition can be decoded by at least one of the single-layer decoders. Based on the multi-layer video decoder being capable of decoding the bitstream, the multi-layer video decoder may decode the bitstream.

In some examples of this disclosure, a decoder that conforms to a list of triplets of profile, tier and level is required to be able to decode any conforming output layer set for which there is at least one partitioning scheme that satisfies the following condition: for each partition of the partitioning scheme, one of the single-layer decoders of the multi-layer decoder can be assigned for decoding the partition. When a single-layer decoder is assigned a partition for decoding, the single-layer decoder may decode the partition. In some examples, each of the partitions may be assigned to a different one of the single-layer decoders. In other examples, two or more partitions may be assigned to a single one of the single-layer decoders. Furthermore, in some examples, the number of PTL triplets advertised by the decoder and their association of each triplet to a core is only a possibility. In such examples, the decoder may have any internal implementation (e.g., just one super-core) but still advertise multiple PTL triplets.

Thus, in some examples, a video processing device, such as video decoder 30 or another device, may obtain, from a bitstream, one or more syntax elements that indicate one or more partitioning schemes. To determine whether a multi-layer video decoder, such as video decoder 30, is capable of decoding the bitstream, the video processing device may determine, based on a condition being satisfied, that the multi-layer video decoder is capable of decoding the bitstream. In this example, the condition is satisfied based on there being a suitable partitioning scheme in the one or more partitioning schemes. For each respective partition of the suitable partitioning scheme, one of the single-layer decoders of the multi-layer video decoder can be assigned for decoding the respective partition.

In accordance with another example techniques of this disclosure, bitstream conformance tests are specified to test the conformance of each partition, in a manner that decoded pictures and other necessary information for all direct or indirect reference layers of the layers in the partition are assumed to be available similarly as the current specification in the recent SHVC/MV-HEVC specifications for the base layer when it is externally provided.

In some examples, the conformance tests for a partition of a bitstream are defined, and the conformance of the bitstream is defined based on the conformance of all the partitions of each partitioning scheme specified for the bitstream. In some examples, when one partition is selected for testing, the decoding of the other partitions in the respective partitioning scheme is considered to be decoded by a HRD according to the parameters specified for those partitions.

Figure 2:
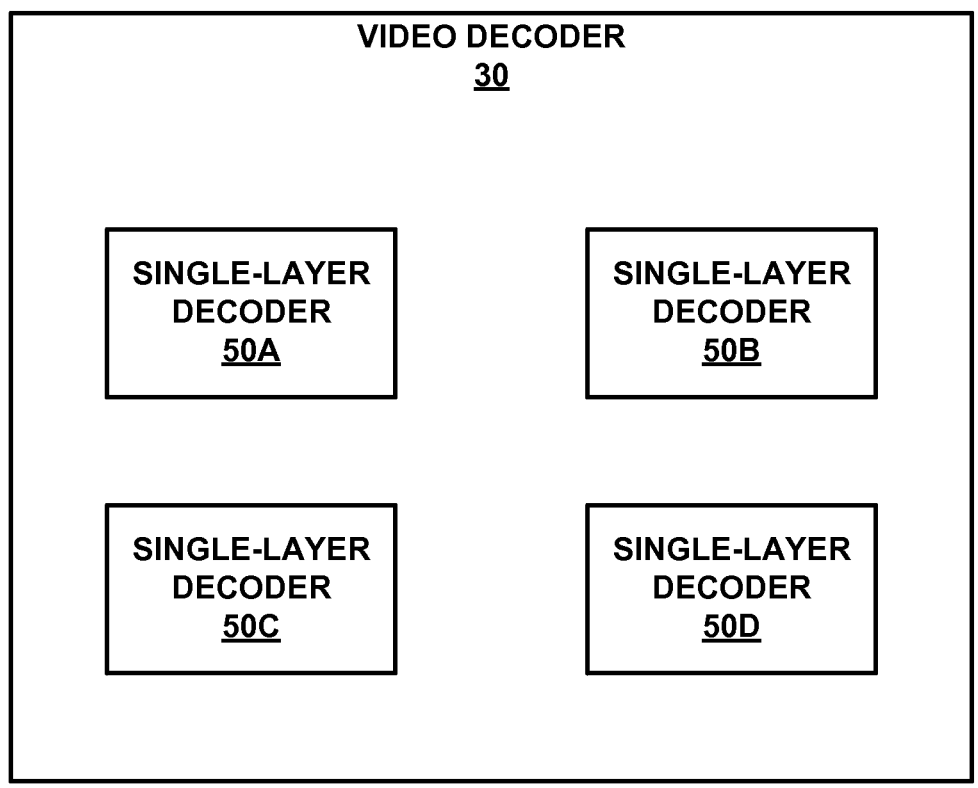
FIG. 2 is a block diagram illustrating an example implementation of a video decoder comprising a plurality of single-layer decoders, in accordance with a technique of this disclosure.

FIG. 2 is a block diagram illustrating an example implementation of video decoder 30 comprising a plurality of single-layer decoders, in accordance with a technique of this disclosure. In the example of FIG. 2, video decoder 30 comprises single-layer decoders 50A-50D (collectively, "single-layer decoders 50"). Each of single-layer decoders 50 may be implemented by a respective separate hardware core. Different ones of single-layer decoders 50 may have different capabilities. For example, different ones of single-layer decoders 50 may be able to decode bitstreams conforming to different profiles, tiers, and levels. In some examples, video decoder 30 may determine, based on the PTL information for partitions of partitioning schemes, a particular partitioning scheme from the one or more partitioning schemes. Video decoder 30 may decode each respective partition of the particular partitioning scheme using a respective one of single-layer decoders 50.

Figure 3:
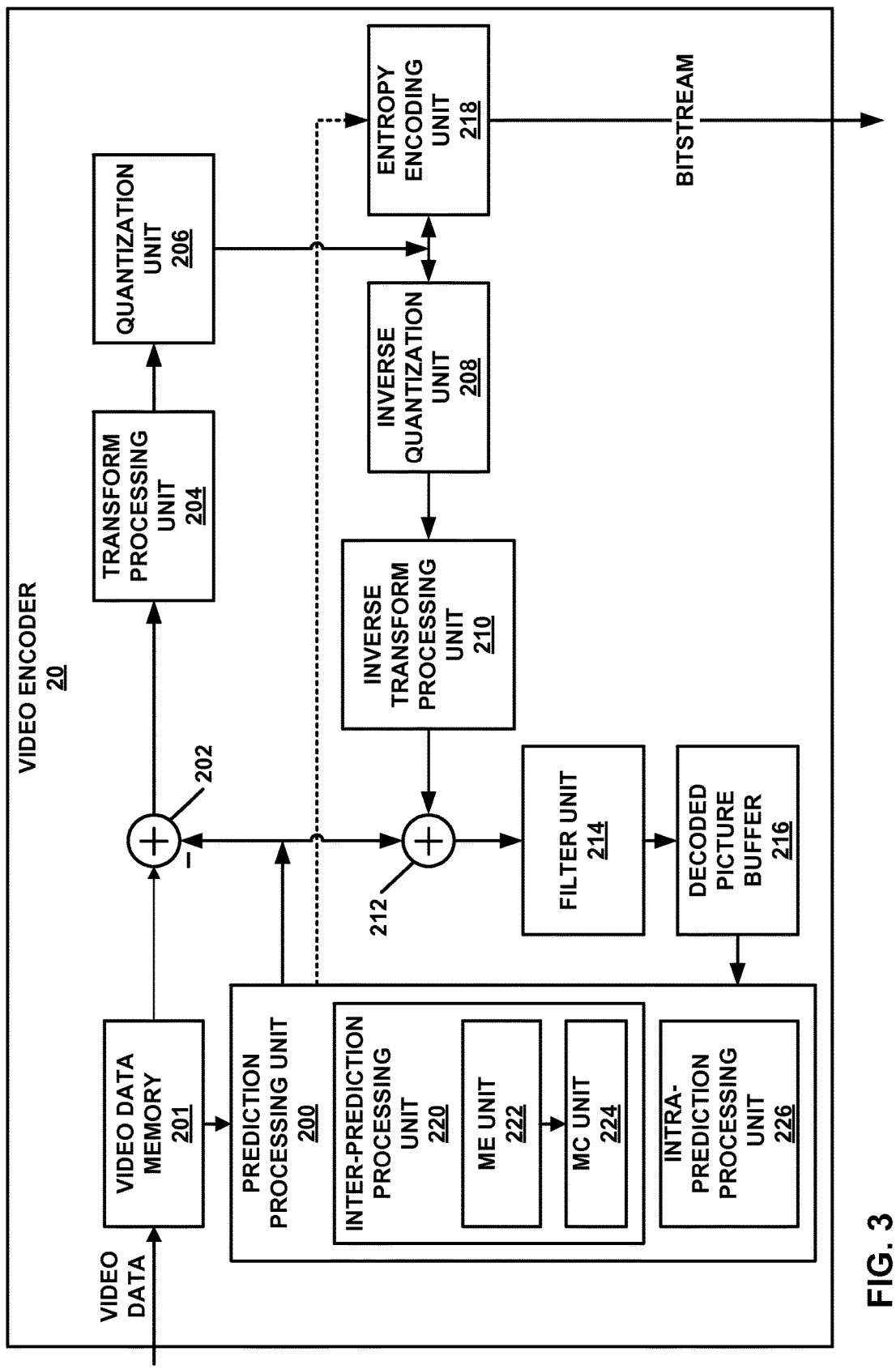
FIG. 3 is a block diagram illustrating an example video encoder that may implement techniques described in this disclosure.

FIG. 3 is a block diagram illustrating an example video encoder 20 that may implement techniques of this disclosure. FIG. 3 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 3, video encoder 20 includes a prediction processing unit 200, a residual generation unit 202, a transform processing unit 204, a quantization unit 206, an inverse quantization unit 208, an inverse transform processing unit 210, a reconstruction unit 212, a filter unit 214, a decoded picture buffer 216, and an entropy encoding unit 218. Prediction processing unit 200 includes an inter-prediction processing unit 220 and an intra-prediction processing unit 226. Inter-prediction processing unit 220 includes a motion estimation unit 222 and a motion compensation unit 224. In other examples, video encoder 20 may include more, fewer, or different functional components.

Video encoder 20 may receive video data. Video data memory 201 may store video data to be encoded by the components of video encoder 20. The video data stored in video data memory 201 may be obtained, for example, from video source 18. Decoded picture buffer 216 may be a reference picture memory that stores reference video data for use in encoding video data by video encoder 20, e.g., in intra- or inter-coding modes. Video data memory 201 and decoded picture buffer 216 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 201 and decoded picture buffer 216 may be provided by the same memory device or separate memory devices. In various examples, video data memory 201 may be on-chip with other components of video encoder 20, or off-chip relative to those components.

Video encoder 20 may encode each CTU in a slice of a picture of the video data. Each of the CTUs may be have equally-sized luma coding tree blocks (CTBs) and corresponding CTBs of the picture. As part of encoding a CTU, prediction processing unit 200 may perform quad-tree partitioning to divide the CTBs of the CTU into progressively-smaller blocks. The smaller blocks may be coding blocks of CUs. For example, prediction processing unit 200 may partition a CTB of a CTU into four equally-sized sub-blocks, partition one or more of the sub-blocks into four equally-sized sub-sub-blocks, and so on.

Video encoder 20 may encode CUs of a CTU to generate encoded representations of the CUs (i.e., coded CUs). As part of encoding a CU, prediction processing unit 200 may partition the coding blocks of the CU among one or more PUs of the CU. Thus, each PU may have a luma prediction block and corresponding chroma prediction blocks. Video encoder 20 and video decoder 30 may support PUs having various sizes. As indicated above, the size of a CU may refer to the size of the luma coding block of the CU and the size of a PU may refer to the size of a luma prediction block of the PU. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 220 may generate predictive data for a PU by performing inter prediction on each PU of a CU. The predictive data for the PU may include predictive blocks of the PU and motion information for the PU. Inter-prediction processing unit 220 may perform different operations for a PU of a CU depending on whether the PU is in an I slice, a P slice, or a B slice. In an I slice, all PUs are intra predicted. Hence, if the PU is in an I slice, inter-prediction processing unit 220 does not perform inter prediction on the PU.

If a PU is in a P slice, motion estimation unit 222 may search the reference pictures in a list of reference pictures (e.g., "RefPicList0") for a reference region for the PU. The reference region for the PU may be a region, within a reference picture, that contains samples that most closely correspond to the prediction blocks of the PU. Motion estimation unit 222 may generate a reference index that indicates a position in RefPicList0 of the reference picture containing the reference region for the PU. In addition, motion estimation unit 222 may generate a motion vector that indicates a spatial displacement between a coding block of the PU and a reference location associated with the reference region. For instance, the motion vector may be a two-dimensional vector that provides an offset from the coordinates in the current picture to coordinates in a reference picture. Motion estimation unit 222 may output the reference index and the motion vector as the motion information of the PU. Motion compensation unit 224 may generate the predictive blocks of the PU based on actual or interpolated samples at the reference location indicated by the motion vector of the PU.

If a PU is in a B slice, motion estimation unit 222 may perform uni-prediction or bi-prediction for the PU. To perform uni-prediction for the PU, motion estimation unit 222 may search the reference pictures of RefPicList0 or a second reference picture list ("RefPicList1") for a reference region for the PU. Motion estimation unit 222 may output, as the motion information of the PU, a reference index that indicates a position in RefPicList0 or RefPicList1 of the reference picture that contains the reference region, a motion vector that indicates a spatial displacement between a prediction block of the PU and a reference location associated with the reference region, and one or more prediction direction indicators that indicate whether the reference picture is in RefPicList0 or RefPicList1. Motion compensation unit 224 may generate the predictive blocks of the PU based at least in part on actual or interpolated samples at the reference location indicated by the motion vector of the PU.

To perform bi-directional inter prediction for a PU, motion estimation unit 222 may search the reference pictures in RefPicList0 for a reference region for the PU and may also search the reference pictures in RefPicList1 for another reference region for the PU. Motion estimation unit 222 may generate reference indexes that indicate positions in RefPicList0 and RefPicList1 of the reference pictures that contain the reference regions. In addition, motion estimation unit 222 may generate motion vectors that indicate spatial displacements between the reference locations associated with the reference regions and a prediction block of the PU. The motion information of the PU may include the reference indexes and the motion vectors of the PU. Motion compensation unit 224 may generate the predictive blocks of the PU based at least in part on actual or interpolated samples at the reference locations indicated by the motion vectors of the PU.

Intra-prediction processing unit 226 may generate predictive data for a PU by performing intra prediction on the PU. The predictive data for the PU may include predictive blocks for the PU and various syntax elements. Intra-prediction processing unit 226 may perform intra prediction on PUs in I slices, P slices, and B slices.

To perform intra prediction on a PU, intra-prediction processing unit 226 may use multiple intra prediction modes to generate multiple sets of predictive blocks for the PU. When performing intra prediction using a particular intra prediction mode, intra-prediction processing unit 226 may generate predictive blocks for the PU using a particular set of samples from neighboring blocks. The neighboring blocks may be above, above and to the right, above and to the left, or to the left of the prediction blocks of the PU, assuming a left-to-right, top-to-bottom encoding order for PUs, CUs, and CTUs. Intra-prediction processing unit 226 may use various numbers of intra prediction modes, e.g., 33 directional intra prediction modes. In some examples, the number of intra prediction modes may depend on the size of the prediction blocks of the PU.

Prediction processing unit 200 may select the predictive data for PUs of a CU from among the predictive data generated by inter-prediction processing unit 220 for the PUs or the predictive data generated by intra-prediction processing unit 226 for the PUs. In some examples, prediction processing unit 200 selects the predictive data for the PUs of the CU based on rate/distortion metrics of the sets of predictive data. The predictive blocks of the selected predictive data may be referred to herein as the selected predictive blocks.

Residual generation unit 202 may generate, based on the coding blocks of a CU and the selected predictive blocks of the PUs of the CU, residual blocks of the CU. For example, residual generation unit 202 may generate, based on the luma, Cb and Cr coding block of a CU and the selected predictive luma, Cb and Cr blocks of the PUs of the CU, luma, Cb and Cr residual blocks of the CU. In some examples, residual generation unit 202 may generate the residual blocks of the CU such that each sample in the residual blocks has a value equal to a difference between a sample in a coding block of the CU and a corresponding sample in a corresponding selected predictive block of a PU of the CU.

Transform processing unit 204 may perform quad-tree partitioning to partition the residual blocks of a CU into transform blocks of TUs of the CU. Thus, a TU may have a luma transform block and two corresponding chroma transform blocks. The sizes and positions of the transform blocks of TUs of a CU may or may not be based on the sizes and positions of prediction blocks of the PUs of the CU.

Transform processing unit 204 may generate transform coefficient blocks for each TU of a CU by applying one or more transforms to the transform blocks of the TU. Transform processing unit 204 may apply various transforms to a transform block of a TU. For example, transform processing unit 204 may apply a discrete cosine transform (DCT), a directional transform, or a conceptually-similar transform to a transform block. In some examples, transform processing unit 204 does not apply transforms to a transform block. In such examples, the transform block may be treated as a transform coefficient block.

Quantization unit 206 may quantize the transform coefficients in a coefficient block. The quantization process may reduce the bit depth of some or all of the transform coefficients. For example, an n-bit transform coefficient may be rounded down to an m-bit transform coefficient during quantization, where n is greater than m. Quantization unit 206 may quantize a coefficient block of a TU of a CU based on a quantization parameter (QP) value for the CU. Video encoder 20 may adjust the degree of quantization applied to the coefficient blocks of a CU by adjusting the QP value for the CU. Quantization may introduce loss of information, thus quantized transform coefficients may have lower precision than the original ones.

Inverse quantization unit 208 and inverse transform processing unit 210 may apply inverse quantization and inverse transforms to a coefficient block, respectively, to reconstruct a residual block from the coefficient block. Reconstruction unit 212 may add the reconstructed residual block to corresponding samples from one or more predictive blocks generated by prediction processing unit 200 to produce a reconstructed transform block of a TU. By reconstructing transform blocks for each TU of a CU in this way, video encoder 20 may reconstruct the coding blocks of the CU.

Filter unit 214 may perform one or more deblocking operations to reduce blocking artifacts in the coding blocks of a CU. Decoded picture buffer 216 may store the reconstructed coding blocks after filter unit 214 performs the one or more deblocking operations on the reconstructed coding blocks. Inter-prediction processing unit 220 may use a reference picture that contains the reconstructed coding blocks to perform inter prediction on PUs of other pictures. In addition, intra-prediction processing unit 226 may use reconstructed coding blocks in decoded picture buffer 216 to perform intra prediction on other PUs in the same picture as the CU.

Entropy encoding unit 218 may receive data from other functional components of video encoder 20. For example, entropy encoding unit 218 may receive coefficient blocks from quantization unit 206 and may receive syntax elements from prediction processing unit 200. Entropy encoding unit 218 may perform one or more entropy encoding operations on the data to generate entropy-encoded data. For example, entropy encoding unit 218 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. Video encoder 20 may output a bitstream that includes entropy-encoded data generated by entropy encoding unit 218.

In accordance with some examples of this disclosure, entropy encoding unit 218 may include, in the bitstream, one or more syntax elements indicating one or more partitioning schemes. For each respective partitioning scheme of the one or more partitioning schemes, the respective partitioning scheme specifies a respective set of disjoint partitions whose union forms an output layer set, wherein each respective partition of the respective set of disjoint partitions contains one or more layers, the output layer set may consist of all layers of the plurality of layers or a proper subset of the plurality of layers.

Figure 4:
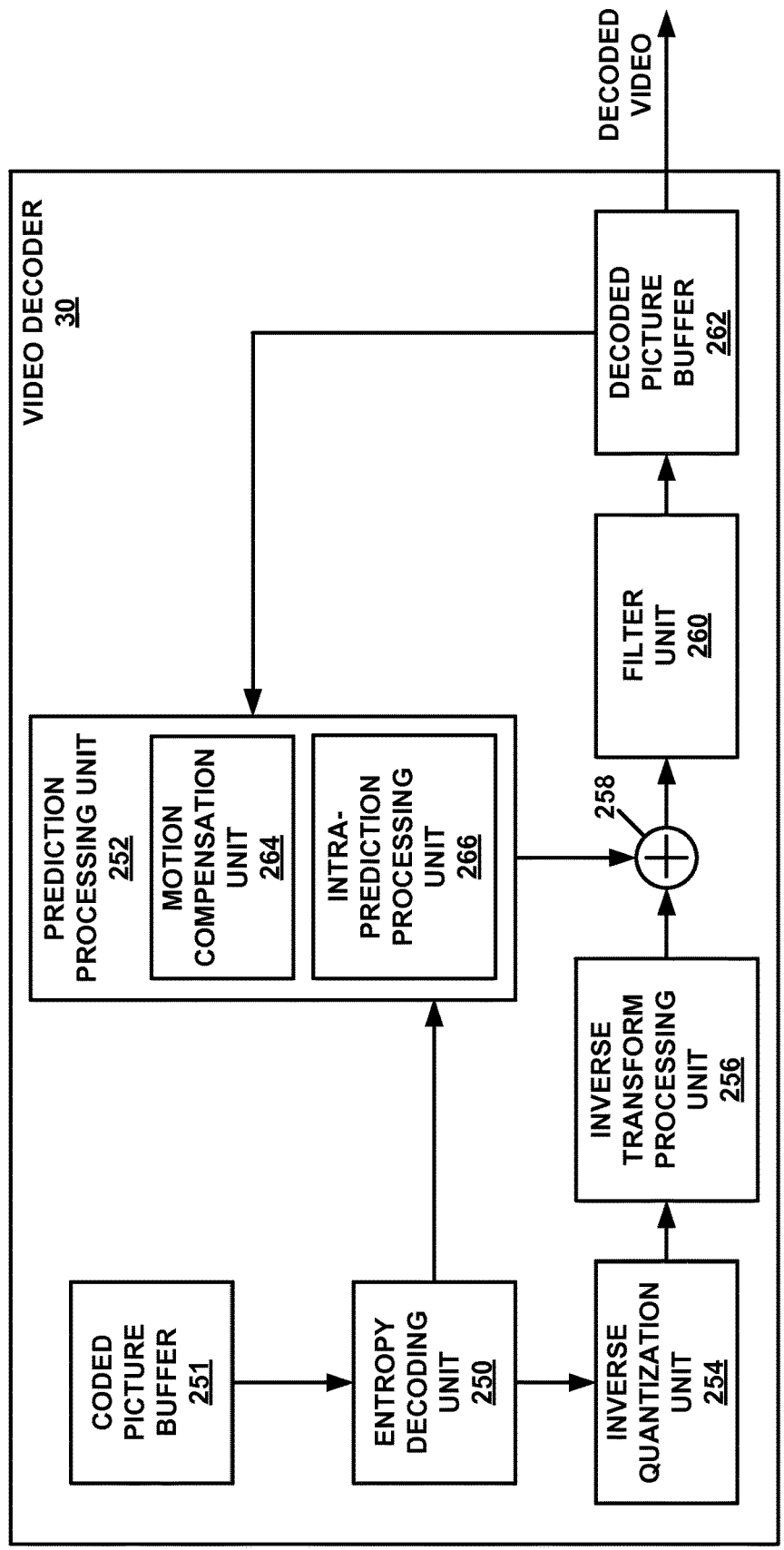
FIG. 4 is a block diagram illustrating an example video decoder that may implement techniques described in this disclosure.

FIG. 4 is a block diagram illustrating an example video decoder 30 that may implement techniques of this disclosure. FIG. 4 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 4, video decoder 30 includes an entropy decoding unit 250, a prediction processing unit 252, an inverse quantization unit 254, an inverse transform processing unit 256, a reconstruction unit 258, a filter unit 260, and a decoded picture buffer 262. Prediction processing unit 252 includes a motion compensation unit 264 and an intra-prediction processing unit 266. In other examples, video decoder 30 may include more, fewer, or different functional components.

A coded picture buffer (CPB) 251 may receive and store encoded video data (e.g., NAL units) of a bitstream. The video data stored in CPB 151 may be obtained, for example, from computer-readable medium 16, e.g., from a local video source, such as a camera, via wired or wireless network communication of video data, or by accessing physical data storage media. CPB 151 may form a video data memory that stores encoded video data from an encoded video bitstream. Decoded picture buffer 162 may be a reference picture memory that stores reference video data for use in decoding video data by video decoder 30, e.g., in intra- or inter-coding modes. CPB 151 and decoded picture buffer 162 may be formed by any of a variety of memory devices, such as dynamic random access memory (DRAM), including synchronous DRAM (SDRAM), magnetoresistive RAM (MRAM), resistive RAM (RRAM), or other types of memory devices. CPB 151 and decoded picture buffer 162 may be provided by the same memory device or separate memory devices. In various examples, CPB 151 may be on-chip with other components of video decoder 30, or off-chip relative to those components.

Entropy decoding unit 250 may receive NAL units from CPB 251 and parse the NAL units to obtain syntax elements from the bitstream. Entropy decoding unit 250 may entropy decode entropy-encoded syntax elements in the NAL units. Prediction processing unit 252, inverse quantization unit 254, inverse transform processing unit 256, reconstruction unit 258, and filter unit 260 may generate decoded video data based on the syntax elements obtained from the bitstream.

For example, entropy decoding unit 250 may obtain, from the bitstream, one or more syntax elements indicating one or more partitioning schemes. Prediction processing unit 252, inverse quantization unit 254, inverse transform processing unit 256, reconstruction unit 258, and filter unit 260 may decode the partitions of a particular partitioning scheme. In some examples, for each respective partitioning scheme of the one or more partitioning schemes, entropy decoding unit 250 obtains, from a SEI message in the bitstream or VUI in a VPS in the bitstream, a respective set of HRD parameter sets for the respective partitioning scheme. Video decoder 30 may test, based on the HRD parameters for the one or more partitioning schemes, each partition of each of the one or more partitioning schemes for conformance to a video coding standard.

The NAL units of the bitstream may include coded slice NAL units. As part of decoding the bitstream, entropy decoding unit 250 may entropy decode syntax elements from the coded slice NAL units. Each of the coded slices may include a slice header and slice data. The slice header may contain syntax elements pertaining to a slice.

In addition to obtaining syntax elements from the bitstream, video decoder 30 may perform a decoding operation on a CU. By performing the decoding operation on a CU, video decoder 30 may reconstruct coding blocks of the CU.

As part of performing a decoding operation on a CU, inverse quantization unit 254 may inverse quantize, i.e., de-quantize, coefficient blocks of TUs of the CU. Inverse quantization unit 254 may use a QP value for the CU of the TU to determine a degree of quantization and, likewise, a degree of inverse quantization for inverse quantization unit 254 to apply. That is, the compression ratio, i.e., the ratio of the number of bits used to represent original sequence and the compressed one, may be controlled by adjusting the value of the QP used when quantizing transform coefficients. The compression ratio may also depend on the method of entropy coding employed.

After inverse quantization unit 254 inverse quantizes a coefficient block, inverse transform processing unit 256 may apply one or more inverse transforms to the coefficient block in order to generate a residual block for the TU. For example, inverse transform processing unit 256 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 266 may perform intra prediction to generate predictive blocks for the PU. For example, intra prediction processing unit 266 may perform intra prediction to generate luma, Cb, and Cr predictive blocks for the PU. Intra-prediction processing unit 266 may use an intra prediction mode to generate the predictive blocks for the PU based on the prediction blocks of spatially-neighboring PUs. Intra-prediction processing unit 266 may determine the intra prediction mode for the PU based on one or more syntax elements obtained from the bitstream.

Prediction processing unit 252 may construct a first reference picture list (RefPicList0) and a second reference picture list (RefPicList1) based on syntax elements extracted from the bitstream. Furthermore, if a PU is encoded using inter prediction, entropy decoding unit 250 may obtain motion information for the PU. Motion compensation unit 264 may determine, based on the motion information of the PU, one or more reference regions for the PU. Motion compensation unit 264 may generate, based on samples at the one or more reference blocks for the PU, predictive blocks for the PU. For example, motion compensation unit 264 may generate, based on samples of the one or more reference blocks for the PU, luma, Cb, and Cr predictive blocks for the PU.

Reconstruction unit 258 may use the residual values from the transform blocks of TUs of a CU and predictive blocks of PUs of the CU to reconstruct coding blocks of the CU. For example, reconstruction unit 258 may use residual values from luma, Cb, and Cr transform blocks of TUs of a CU and the predictive luma, Cb, and Cr blocks of the PUs of the CU to reconstruct the luma, Cb, and Cr coding blocks of the CU. For example, reconstruction unit 258 may add samples of transform blocks to corresponding samples of the predictive blocks to reconstruct the coding blocks of the CU.

Filter unit 260 may perform a deblocking operation to reduce blocking artifacts associated with the coding blocks of the CU. Video decoder 30 may store the coding blocks of the CU in decoded picture buffer 262. Decoded picture buffer 262 may provide reference pictures for subsequent motion compensation, intra prediction, and presentation on a display device, such as display device 32 of FIG. 1. For instance, video decoder 30 may perform, based on the blocks in decoded picture buffer 262, intra prediction or inter prediction operations on PUs of other CUs. In this way, video decoder 30 may obtain, from the bitstream, transform coefficient levels of a coefficient block, inverse quantize the transform coefficient levels, apply a transform to the transform coefficient levels to generate a transform block, generate, based at least in part on the transform block, a coding block, and output the coding block for display.

The following sections of this disclosure describe some implementation details of some of example techniques of this disclosure described above. The following text shows changes to implement one or more techniques of this disclosure. Tags <insert>. . . </insert> indicates text added. Tags <delete>. . .</delete> indicate deleted text. Names of syntax elements are shown in bold face.

As indicated above, in accordance with some techniques of this disclosure, video encoder 20 may signal one or more partitioning schemes. Each of the partitioning schemes divides the layers in an output layer set into one or more partitions. Each layer in an output layer set shall belong to exactly one partition in a partitioning scheme.

Table 3, below, indicates changes to VPS extension syntax to signal partitioning schemes defined in SHVC WD6 and MV-HEVC WD8.

TABLE 3

|  | Descriptor |
|---|---|
| vps_extension( ) { | |
|     avc_base_layer_flag | u(1) |
|     ... | u(1) |
|     for( i = 1; i < NumOutputLayerSets; i++ ) { | |
|         if( i > vps_num_layer_sets_minus1 ) | |
|             output_layer_set_idx_minus1[ i ] | u(v) |
|         if( i > vps_num_layer_sets_minus1 \| \| defaultTargetOutputLayerIdc = = 2 ) | |
|             for( j = 0; j < NumLayersInIdList[ LayerSetIdxForOutputLayerSet[ i ] ]; j++) | |
|                 output_layer_flag[ i ][ j ] | u(1) |
|         profile_level_tier_idx[ i ] | u(v) |
|         num_partition_schemes[ i ] | ue(v) |
|         for( j = 0; j < num_partition_schemes[ i ]; j++ ) { | |
|             num_partitions_in_scheme_minus1[ i ][ j ] | ue(v) |
|             for( k = 0; k < num_partitions_in_scheme_minus1[ i ][ j ]; k++ ) { | |
|                 for( r = 0; r <= vps_max_layers_minus1; r++ ) | |
|         if( layer_id_included_flag[ LayerSetIdxForOutputLayerSet[ i ] ][ r ] ) | |
|                 layer_included_in_partition_flag[ i ][ j ][ k ][ r ] | u(1) |
|                 profile_level_tier_partition_idx[ i ][ j ][ k ] | u(v) |
|             } | |
|         } | |
|         if( NumOutputLayersInOutputLayerSet[ i ] = = 1 && NumDirectRefLayers[ OlsHighestOutputLayerId[ i ] ] > 0 ) | |
|             alt_output_layer_flag[ i ] | u(1) |
|     } | |
|     ... | |
| } | |

In the example of Table 3, num_partition_schemes[i] specifies the number of partitioning schemes[i] specified for the i-th output layer set. The value of num_partition_schemes shall be in the range of 0 to 15, inclusive. Furthermore, num_partitions_in_scheme_minus1[i][j] plus 1 specifies the number of partitions in the j -th partitioning scheme of the i-th output layer set. The value of num_partitions_in_scheme_minus1[i][j] shall be in the range of 0 to NumLayersInIdList[LayerSetIdxForOutputLayerSet[i]]−1, inclusive.

Furthermore, in the example of Table 3, layer_included_in_partition_flag[i][j][k][r] equal to 1 specifies that the r-th layer specified in the VPS is included in the k-th partition of the j-th partitioning scheme of the i-th output layer set. Layer_included_in_partition_flag[i][j][k][r] equal to 0 specifies that the r-th layer specified in the VPS is not included in the k-th partition of the j-th partitioning scheme of the i-th output layer set.

Thus, for each respective partitioning scheme, for each respective partition of the respective partitioning scheme, for each respective layer of the output layer set, video decoder 30 may obtain, from the bitstream, a syntax element (i.e., layer_included_in_partition_flag) indicating whether the respective layer is included in the respective partition. In a similar example, for each respective partitioning scheme of the one or more partitioning schemes, for each respective partition of the respective partitioning scheme, for each respective layer of the output layer set, video encoder 20 may include, in a bitstream, a syntax element (i.e., layer_included_in_partition_flag) indicating whether the respective layer is included in the respective partition.

In the example of Table 3, it is a requirement of bitstream conformance that for each layer with nuh_layer_id equal to currLayerId in the i-th output layer set, there exists one and only one value of k in the range of 0 to num_partitions_in_scheme_minus1[i][j], inclusive, for each partitioning scheme with index j of the i-th output layer set, such that layer_included_in_partition_flag[i][j][k][LayerIdxInVps[currLayerId] is equal to 1.

As mentioned above, in accordance with some examples of this disclosure, signaling of a profile, a tier, and a level is provided for each partition. As shown in the example of Table 3, profile_level_tier_partition_idx[i][j][k] specifies the index, into the list of profile_tier_level( ) syntax structures in the VPS, of the profile_tier_level( ) syntax structure that applies to the k-th partition of the j-th partitioning scheme of the i-th output layer set. The length of the profile_level_tier_partition_idx[i] syntax element is Ceil(Log2(vps_num_profile_tier_level_minus1+1) ) bits. The value of profile_level_tier_idx[0][0][0] is inferred to be equal to 0. The value of profile_level_tier_partition_idx[i] shall be in the range of 0 to vps_num_profile_tier_level_minus1, inclusive.

In another example, the changes shown in Table 4 may be made to the VPS extension syntax in order to signal partitioning schemes. The changes shown in Table 4 are relative to Table 3, above.

TABLE 4

|  | Descriptor |
|---|---|
| vps_extension( ) { | |
| ... | |
|    profile_level_tier_idx[ i ] | u(v) |
|    num_partitioning_schemes_minus1[ i ] | ue(v) |
|    for( j = 1; j = num_partitioning_schemes_minus1[ i ]; j++ ) { | |
|       num_partitions_in_scheme_minus2[ i ][ j ] | ue(v) |
|       for( k = 0; k <= NPartitionsInScheme | |
|          for( r = 0; r <= vps_max_layers_minus1; r++ ) | |
|             if( layer_id_included_flag[ LayerSetIdxForOutputLayerSet[ i ] ][ r ] ) | |
|                layer_included_in_partition_flag[ i ][ j ][ k ][ r ] | u(1) |
|       profile_level_tier_partition_idx[ i ][ j ][ k ] | u(v) |
|       } | |
|    } | |
| ... | |

In the example of Table 4, the following changes may be made to the semantics of particular syntax elements of the VPS extension described above with reference to Table 3. num partition<insert>ing</insert> schemes<insert> minus1</insert>[i]

<insert>plus 1</insert> specifies the number of partitioning schemes specified for the i-th output layer set. The value of num_partition<insert>ing</insert>_schemes<insert>_minus1</insert>[i] shall be in the range of 0 to 15, inclusive.

num_partitions_in_scheme_minus<delete>1</delete><insert>2</insert>[i][j] plus <delete>1</delete><insert>2<insert> specifies the number of partitions in the j-th partitioning scheme of the i-th output layer set. The value of num_partitions_in_scheme_ minus<delete>1</delete><insert>2</insert>[i][j] shall be in the range of 0 to NumLayersInIdList[LayerSetIdxForOutputLayerSet[i]]−1, inclusive<insert>.</insert>

<insert>The value of variable NumPartitionInScheme[i][j] is derived as follow:
NumPartitionsInScheme[i][j]=(j==0)?1: num_partitions_in_scheme_minus2[i][j]+2.</insert>

<delete>It is a requirement of bitstream conformance that when j is greater than 0, the value of num_partitions_in_scheme_minus1[i][j] shall be greater than 0.</delete> layer_included_in_partition_flag[i][j][k][r] equal to 1 specifies that the r-th layer specified in the VPS is included in the k-th partition of the j-th partitioning scheme of the i-th output layer set. Layer_included_inpartition_flag[i][j][k][r] equal to 0 specifies that the r-th layer specified in the VPS is not included in the k-th partition of the j-th partitioning scheme of the i-th output layer set. <insert>The value of layer_included_in_partition_flag[i][0][0][r] is inferred to be equal to the value of layer_id_included_flag[LayerSetIdxForOutputLayerSet[i]][r] for r in the range from 0 to vps_max_layers_minus1, inclusive.</insert>

<insert>NOTE 5—</insert><delete>It is a requirement of bitstream conformance that f</delete><insert>F</insert> or each layer with nuh_layer_id equal to currLayerId in the i-th output layer set, there exists one and only one value of k in the range of 0 to <delete>n</delete><insert>N</insert>um<delete>_p </delete><insert>P</insert>artitions<delete>_i</delete><insert>I</insert>n<delete>_s</delete><insert>S</insert>cheme<delete>_minus1</delete>[i][j]<delete>,inclusiv e</delete>, for each partitioning scheme with index j of the i-th output layer set, such that layer_included_in_partition_flag[i][j][k][LayerIdxInVps[currLayerId] is equal to 1.

profile_level_tier_partition_idx[i][j][k] specifies the index, into the list of profile_tier_level( ) syntax structures in the VPS, of the profile_tier_level( ) syntax structure that applies to the k-th partition of the j-th partitioning scheme of the i-th output layer set. The length of the profile_level_tier_partition_idx[i]<insert>[j][k]</insert> syntax element is Ceil(Log2(vps_num_profile_tier_level_minus1+1) ) bits. The valueof profile_level_tier_<insert>partition_</insert>idx[0][0][0] is inferred to be equal to 0. <insert>The value of profile_level_tier_partition_idx[i][0][0] is set to be equal to profile_level_tier_idx[i] for i in the range of 1 to NumOutputLayerSets −1, inclusive.</insert> The value of profile_level_tier_partition_idx[i]<insert>[j][k]</insert> shall be in the range of 0 to vps_num_profile_tier_level_minus1, inclusive.

In some examples, a constraint is added such that no more than one partitioning scheme for each output layer set contains only one partition. Furthermore, in some examples, the syntax element profile_tier_level_idx[i] is not signalled and the profile_tier_tier_partition_idx[i][j][k] syntax element is used to signal the profile, tier and level indications of the partitioning scheme of the output layer set that contains one partition including all the layers of the output layer set.

Furthermore, in accordance with some techniques of this disclosure, level limits and restrictions that define profiles, tiers, and levels, are partition specific. The following text indicates other changes to MV-HEVC WD8 in order to implement partition-specific level limits and restrictions for profiles, tiers, and levels.

G.11 Profiles, tiers, and levels
G.11.1 Profiles
G.11.1.2 Stereo Main profile
<insert>Bitstreams containing output layer sets with partitions of layers conforming to the Stereo Main profile shall obey the following constraints on the derived sub-bitstream for each of the output layer sets, with layerSetIdx being the index of the layer set for the output layer set, the sub-bitstream being derived by invoking the sub-bitstream extraction process as specified in subclause F.10 with the bitstream, tIdTarget equal to 7, and
TargetDecLayerIdList containing the nuh_layer_id values of the layer set with the index layerSetIdx as inputs, the partitions being derived by invoking the demultiplexing process for deriving a bitstream partition as specified in subclause C.6 with the sub-bitstream, the list of layers in the partition listOfLayersInPartition, and the number of layers in the partition numLayersInPartition as inputs.</insert>
Bitstreams <insert>corresponding to sub-bitstreams for output layer sets with partitions of layers</insert> conforming to the Stereo Main profile shall obey the following constraints:
 The sub-bitstream resulting from the sub-bitstream extraction process with any value of tIdTarget and a value of 0 in layerIdListTarget as inputs shall conform to the Main profile.
 The bitstream shall contain one layer with nuh_layer_id equal to i for which ViewScalExtLayerFlag[i] is equal to 1.
 When ViewScalExtLayerFlag[i] is equal to 1, inter_view_mv_vert_constraint_flag shall be equal to 1 in the sps_multilayer_extension( )syntax structure of the active SPS RB SP for the layer with nuh_layer_id equal to 1.
 When ViewScalExtLayerFlag[i] is equal to 1, ScalabilityId[LayerIdxInVps[i]][smIdx] shall be equal to 0 for any smIdx value from 0 to 15, inclusive, that is not equal to 1, for any coded picture with nuh_layer_id equal to i.
 When ViewScalExtLayerFlag[i] is equal to 1, num_scaled_ref_layer_offsets shall be equal to 0 in each active SPS for the layer with nuh_layer_id equal to i.
 When ViewScalExtLayerFlag[i] is equal to 1, the values of pic_width_in_luma_samples and pic_height_in_luma_samples in the active SPS for the layer with nuh_layer_id equal to i shall be equal to the values of pic_width_in_luma_samples and pic_height_in_luma _samples, respectively, in the active SPSs for all direct reference layers of that layer.
 The bitstream shall contain a sub-bitstream consisting of two layers having nuh_layer_id equal to 0 and nuhLayerIdA for whichScalabilityId[LayerIdxInVps[nuhLayerIdA]][smIdx] shall be equal to 0 for any smIdx from 0 to 15, inclusive that is not equal to 1.
 VPSs shall have avc_base_layer_flag equal to 0 only.
 VPSs shall have vps_num_rep_formats_minus1 in the range of 0 to 15, inclusive.
 SPSs shall have sps_extension_type_flag[i] equal to 0 only for i equal to 0, and in the range of 2 to 6, inclusive.
 PPSs shall have pps_extension_type_flag[i] equal to 0 only for i in the range of 1 to 6, inclusive.
 <insert>In the remainder of this subclause and subclause G.11.3, for a sub-bitstream of an output layer set, general_profile_idc, general_profile_compatibility_flag[i], general_tier_flag, and general_level_idc refer to the general_profile_idc, general_profile_compatibility flag[i], general_tier_flag, and general_level_idc, respectively, in the profile_tier_level( ) syntax structure for the output layer set. Conformance of a sub-bitstream of an output layer set to the Stereo Main profile is indicated by general_profile_idc being equal to 5 or general_profile_compatibility_flag[5] being equal to 1.
 NOTE—When general_profile_compatibility_flag[5] is equal to 1, general_profile_compatibility_flag[i] for i equal to 1 should also be equal to 1.</insert>

Furthermore, to implement partition-specific level limits and restrictions for profiles, tiers, and levels, the following changes may be to Paragraph G.11.2 of JCTVC-Q0145, which itself modifies Paragraph G.11.2 of Chen et al., "High efficiency video coding (HEVC) scalable extensions Draft 5, Joint Collaborative Team on Video Coding (JCT-VC) of ITU-T SG 16 WP 3and ISO/IEC JTC 1/SC 29/WG 11, 16th Meeting: San José, US, 9-17 Jan. 2014, document JCTVC-P1008_v4.

G.11.2 Tiers and levels
G.11.2.1 General tier and level limits
For purposes of comparison of tier capabilities, the tier with general_tier_flag equal to 0is considered to be a lower tier than the tier with general_tier_flag equal to 1. For purposes of comparison of level capabilities, a particular level of a specific tier is considered to be a lower level than some other level of the same tier when the value of the general_level_idc of the particular level is less than that of the other level. The following is specified for expressing the constraints in this subclause, subclause G.11.2.2, and subclause G.11.3:
 Let access unit n be the n-th access unit in decoding order, with the first access unit being access unit 0 (i.e. the 0-th access unit).
 Let the variable fR be set equal to 1÷300.
 Let the variable optLsIdx be the output layer set index of an output layer set contained in a bitstream, and the sub-bitstream of the output layer set be derived by invoking the sub-bitstream extraction process as specified in subclause F.10 with the bitstream, tId-Target equal to 7, and TargetDecLayerIdList containing the nuh_layer_id values of the output layer set as inputs.

<insert>Let the variable partitionIdx be the index to any particular partition of the output layer set with index optLsIdx, and the partition is derived by invoking the demultiplexing process as specied in subclause C.6 with the sub-bitstream, the list of layers in the partition listOfLayersInPartition, and the number of layers in the partition numLayersInPartition as inputs.</insert>

Let the variables numLayersInOptLayerSet and numLayersInSubBitstream be derived as follows:
numLayersInOptLayerSet=NumLayersInIdList
[LayerSetIdxForOutputLayerSet[optLsIdx]]
if(the base layer in the output layer set is provided by external means) numLayersInSubBitstream= numLayerslnOptLayerSet−1 (H-63) else
numLayersInSubBitstream =numLayerslnOptLayerSet Let the variable<insert>partition</insert>Size InSamplesY be derived as follows:
<insert>partition</insert>Size InSamplesY=0 (H-64) for(i=0; i<insert>numLayersInPartition</insert>; i++)
<insert>partition</insert>SizeinSamplesY+=PicSizeInSamplesY of the i-th layer in the <insert>partition</insert>

Let the variable scaleFactor be set equal to Ceil( <insert>partition</insert>SizeInSamplesY/MaxLumaPs), where MaxLumaPs is specified in Table A-1 for the level <insert>of the partition</insert>.

Let the variable max<insert>Partition</insert> Slice-Segs be set equal to scaleFactor* MaxSliceSegmentsPerPicture, where MaxSliceSegmentsPerPicture is specified in Table A-1 <insert>for the tier and level of the partition</insert>.

<insert>Each partition</insert> conforming to a profile at a specified tier and level shall obey the following constraints for each bitstream conformance test as specified in Annex C:

a) For each layer in the <insert>partition</insert>, PicSizeInSamplesY shall be less than or equal to MaxLumaPs, where MaxLumaPs is specified in Table A-1 <insert>for the tier and level of the partition</insert>.

b) For each layer in the <insert>partition</insert>, the value of pic_width_in_luma_samples shall be less than or equal to Sqrt(MaxLumaPs*8).

c) For each layer in the <insert>partition</insert>, the value of pic_height_in_luma_samples shall be less than or equal to Sqrt(MaxLumaPs*8).

d) For each layer with nuh_layer_id equal to currLayerId in the <insert>partition</insert>, the value of max_vps_dec_pic_buff<insert>ering</insert>_minus1[optLsIdx][LayerId xInVps[currLayerId]][HighestTid] shall be less than or equal to MaxDpb Size as derived by Equation A-2, <insert>with PicSizeInSamplesY being replaced with partitionSizeInSamplesY, for the tier and level of the partition</insert>.

e) For level 5 and higher levels, the value of CtbSizeY for each layer in the <insert>partition</insert> shall be equal to 32 or 64.

f) The value of NumPicTotalCurr for each picture in the <insert>partition</insert> shall be less than or equal to 8.

g) When decoding each coded picture in the <insert>partition</insert>, the value of num_tile_columns_minus1 shall be less than MaxTileCols and num_tile_rows_minus1 shall be less than MaxTileRows, where MaxTileCols and MaxTileRows are specified in Table A-1 <insert>for the tier and level of the partition</insert>.

h) For the VCL HRD parameters <insert>of the partition</insert>, CpbSize[i] shall be less than or equal to 1000*MaxCPB for at least one value of i in the range of 0 to cpb_cnt_minus1[HighestTid ], inclusive, where CpbSize[i] is specified in subclause E.3.3 based on parameters selected as specified in subclause C.1 and MaxCPB is specified in Table A-1 for the tier and <insert>for the tier and level of the partition</insert>, in units of 1000 bits.

i) For the NAL HRD parameters <insert>of the partition</insert>, CpbSize[i] shall be less than or equal to 1100 *MaxCPB for at least one value of i in the range of 0 to cpb_cnt_minus1[HighestTid ], inclusive, where CpbSize[i] is specified in subclause E.3.3 based on parameters selected as specified in subclause C.1 and MaxCPB is specified in Table A-1 <insert>for the tier and level of the partition,</insert> in units of 1100 bits.

Table A-1 specifies the limits for each level of each tier. A tier and level to which <insert>a partition</insert> conforms are indicated by the syntax elements general_tier_flag and general_level_idc as follows:

general_tier_flag equal to 0 indicates conformance to the Main tier, and general_tier_flag equal to 1 indicates conformance to the High tier, according to the tier constraints specified in Table A-1. general_tier_flag shall be equal to 0 for levels below level 4 (corresponding to the entries in Table A-1 marked with "-").

general_level_idc shall be set equal to a value of 30 times the level number specified in Table A-1.

JCTVC-Q0145 includes an attachment (JCTVC-Q0145 MvHevcText) that describes changes to Tech et al., "MV-HEVC Draft Text 7," Joint Collaborative Team on 3D Video Coding Extension Development of ITU-T SG 16 WP 3 and ISO/IEC JTC 1/SC 29/WG 11, 7th Meeting: San José, US, 11-17Jan. 2014, JCT3V-G1004-v7. The following text indicates changes to JCTVC-Q0145 MvHevcText in order to implement partition-specific level limits and restrictions for profiles, tiers, and levels. For conciseness, text deleted from JCTVC-Q0145_MvHevcText is omitted below.

G.11.2.2 Profile-specific level limits for the Main, Main 10, and <insert>Stereo Main profiles</insert>

<insert>Each partition</insert> conforming to the Stereo Main profile at a specified tier and level shall obey the following constraints for each <insert> bitstream conformance test</insert> as specified in Annex C-, <insert>, where "access unit" is used to denote the set of pictures contained in the partition, along with their associated non VCL NAL units, of layers contained in the partition and that have the same output time and the CPB is understood to be the BPB</insert>:

a) The nominal removal time of access unit n (with n greater than 0) from the CPB, as specified in subclause C.2.3, shall satisfy the constraint that AuNominalRemovalTime[n]−AuCpbRemovalTime [n−1] is greater than or equal to Max ( <insert>partition</insert>SizeInSamples Y÷Max LumaSr, fR ) , where <insert>partition</insert>SizeInSamplesY is the value of partitionSizeInSamplesY for access unit n−1 and MaxLumaSr is the value specified in Table A-2 that applies to access unit n−1 <insert>for the tier and level of the partition</insert>.

b) The difference between consecutive output times of pictures from the DPB, as specified in subclause C.3.3, shall satisfy the constraint that DpbOutput Interval[n] is greater than or equal to Max( <insert>partition</insert>SizeInSamplesY÷ MaxLumaSr, fR), where <insert>partition</insert>SizeInSamplesY is the value of <insert>partition</insert>SizeInSamplesY of access unit n and MaxLumaSr is the value specified in Table A-2 for access unit n <insert>for the tier and level of the partition</insert> provided that access unit n is an access unit that has a picture that is output and is not the last of such access units.

c) The removal time of access unit 0 shall satisfy the constraint that the number of coded slice segments in access unit 0 is less than or equal to Min(Max (numLayersIn<insert>Partition</insert>, <insert>MaxSliceSegmentsPerPicture</insert>*MaxLuma Sr/MaxLumaPs* (AuCpbRemovalTime[0]−AuNominalRemovalTime[0])+MaxSliceSegmentsPerPicture* <insert>partition</insert>SizeInSamplesY/ MaxLumaPs), <insert>MaxSliceSegmentsPerPicture</insert>), where MaxSliceSegmentsPerPicture, MaxLumaPs and MaxLumaSr are the values specified in Table A-1 and Table A 2 <insert>for the tier and level of the partition</insert>.

d) The difference between consecutive CPB removal times of access units n and n−1 (with n greater than 0) shall satisfy the constraint that the number of coded slice segments in access unit n is less than or equal to Min((Max(numLayersIn <insert>Partition</insert>, <insert>MaxSliceSegmentsPerPicture</insert>*MaxLumaSr/MaxLumaPs* (AuCpbRemovalTime[n]−AuCpbRemovalTime[n−1])), <insert>MaxSliceSegmentsPerPicture</insert>), where numLayersIn <insert>Partition is</insert> the value for access unit n, and <insert>MaxSlice SegmentsPerPicture,</insert> MaxLumaPs, and MaxLumaSr are the values specified in Table A-1 and Table A-2 that apply to access unit n <insert>for the tier and level of the partition</insert>.

e) For the VCL HRD parameters <insert>for the partition</insert>, BitRate[i] shall be less than or equal to CpbBrVclFactor*MaxBR for at least one value of i in the range of 0 to cpb_cnt_minus1[HighestTid], inclusive, where BitRate[i] is specified in subclause E.3.3 based on parameters selected as specified in subclause C.1 and MaxBR is specified in Table A-2 in units of CpbBrVclFactor bits/s, where CpbBrVclFactor is specified in Table A-3 <insert>for the tier and level of the partition</insert>.

f) For the NAL HRD parameters <insertt>for the partition</insert>, BitRate[i] shall be less than or equal to CpbBrNalFactor*MaxBR for at least one value of i in the range of 0 to cpb_cnt_minus1[HighestTid ], inclusive, where BitRate[i] is specified in subclause E.3.3 based on parameters selected as specified in subclause C.1 and MaxBR is specified in Table A-2 in units of CpbBrNalFactor bits/s, where CpbBrNallFactor is specified in Table A-3 <insert>for the tier and level of the partition</insert>.

g) The sum of the NumByteslnNalUnit variables for access unit 0 shall be less than or equal to FormatCapabilityFactor*(Max( <insert>partition</insert>SizeInSamplesY, fR*MaxLumaSr)+MaxLumaSr* (AuCpbRemovalTime[0−AuNominalRemovalTime[0]))÷MinCr, where MaxLumaSr and MinCr are the values specified in Table A-2 and FormatCapabilityFactor is the value specified in Table A-3 that apply to picture 0 <insert>for the tier and level of the partition</insert>.

h) The sum of the NumByteslnNalUnit variables for access unit n (with n greater than 0) shall be less than or equal to FormatCapabilityFactor*MaxLumaSr* (AuCpbRemovalTime[n]−AuCpbRemovalTime[n−1])÷MinCr, where MaxLumaSr and MinCr are the values specified in Table A-2 and FormatCapabilityFactor is the value specified in Table A-3 that apply to picture n sert>for the tier and level of the partition</insert>.

i) The removal time of access unit 0 shall satisfy the constraint that the number of tiles in coded pictures in access unit 0 is less than or equal to Min(Max (numLayersIn<insert>Partition</insert>, MaxTileCols*MaxTileRows*120*(AuCpbRemovalTime [0]−AuNominalRemovalTime[0])+MaxTileCols* MaxTileRows), MaxTileCols*MaxTileRows), where MaxTileCols and MaxTileRows are the values specified in Table A-1 21 insert>for the tier and elvel of the partition</insert>.

j) The difference between consecutive CPB removal times of access units n and n−1 (with n greater than 0) shall satisfy the constraint that the number of tiles in coded pictures in access unit n is less than or equal to Min(Max(numLayersIn<insert>Partition</insert>, MaxTileCols* MaxTileRows*120* (AuCpbRemovalTime[n]−AuCpbRemovalTime[n−1)), MaxTileCols* MaxTileRows), where numLayersIn<insert>Partition</insert>are the values for access unit n, and MaxTileCols and MaxTileRows are the values specified in Table A-1 that apply to access unit n <insert>for the tier and level of the partition</insert>.

Furthermore, in accordance with some examples of this disclosure, the following changes may be made to Paragraph G.11.1.2 Stereo Main Profile of MV-HEVC WD8. In the text below, changes are shown relative to the example version of Paragraph G.11.1.2 described above in this disclosure.

G.11.1.2 Stereo Main profile

<insert>For a bitstream containing output layer sets with paritions conforming to the Stereo Main profile, let
olsdIx be the output layer set index of an output layer set.
layerSetIdx be the layer set index for the output layer set.
the sub bitstream of the output layer set be derived by invoking the sub bitstream extraction process as specifed in the subclause F.10 with the following inputs: the bitstream, tIdTarget equal to 6, and layerIdListTarget containing the nuh later id values of the laters that are included in the layer set with the index layerSetIdx and are primary picture layers.

the base layer bitstream be derived by invoking the sub bitstream extraction process as specified in subcaluse F.10 with the bitstream, tIdTarget equal to 6, and layerIdListTarget containing only one nuh later id value that is equal to 0 as inputs.</insert>

<insert>A</insert><delete>Bitstreams containing output layer sets with partitions of layers conforming to the Stereo Main profile shall obey the following constraints on the derived sub-bitstream for each of the output layer sets, with layerSetIdx being the index of the layer set for the output layer set, the sub-bitstream being derived by invoking the sub-bitstream extraction process as specified in subclause F.10 with the bitstream, tIdTarget equal to 7, and TargetDecLayerIdList containing the nuh layer id values of the layer set with the index layerSetIdx as inputs, the partitions being derived by invoking the demultiplexing process for deriving a bitstream partition as specified in subclause C.6 with the sub-bitstream, the list of layers in the partition listOfLayersInPartition, and the number of layers in the partition numLayersInPartition as inputs B</delete>b<insert>b</insert>itstream <delete>s corresponding to sub-bitstreams for</delete><insert>containing</insert> output layer sets with partitions <delete>of layers</delete> conforming to the Stereo Main profile shall obey the following constraints:

<insert>All active</insert> VPSs shall have vps_base_layer_internal_flag equal to 1 only.

<insert>All active</insert> VPSs shall have vps_num_rep_formats_minus1 in the range of 0 to 15, inclusive.

<delete>Bitstreams containing output layer sets conforming to the Stereo Main profile shall obey the following constraints on the derived sub-bitstream for each of the output layer sets, with output layer set index olsIdx and layerSetIdx being the layer set for the output layer set, and the sub-bitstream being derived by invoking the sub-bitstream extraction process as specified in subclause F.10 with the following inputs: the bitstream, tIdTarget equal to 6, and layerIdListTarget containing the nuh_layer_id values of the layers that are included in the layer set with the index layerSetIdx and are primary picture layers</delete>

<delete> Bitstreams containing output layer sets conforming to the Stereo Main profile shall also obey the following constraints on the base layer bitstream derived by invoking the sub-bitstream extraction process as specified in subclause F.10 with the bitstream, tIdTarget equal to 6, and with layerIdListTarget containing only one nuh_layer_id value that is equal to 0 as inputs.</delete>

The base layer bitstream <delete<derived from bitstreams conforming to the Stereo Main Profile</delete>shall obey the following constraints:

The base layer bitstream shall obey all constraints of the Main profile specified in subclause A.3.2.

<insert>All active</insert> SPSs <delete>of</delete><insert>for</insert> for the base layer <delete<bitstream</delete> shall have general_profile_idc equal to 1 or general_profile_compatibility_flag[1] equal to 1.

The <delete>derived</delete> sub-bitstream <insert>of each</insert><delete>for an</delete> output layer set <delete>conforming to the Stereo Main profile</delete> shall obey the following constraints:

All active SPSs for the sub-bitstream shall have chroma_format_idc_equal to 1 only.

CtbLog2SizeY derived from any active SPS <delete>of</delete><insert>for</insert> the sub-bitstream shall be in the range of 4 to 6, inclusive.

ScalabilityId[j][smIdx] shall be equal to 0 for any smIdx value not equal to 1 and for any value of j for the sub-bitstream.

. . .

In the remainder of this subclause and subclause G.11.3, for a sub-bitstream of an output layer set, general_profile_idc, general_profile_compatibility_flag[i], general_tier_flag, and general_level_idc refer to the general_profile_idc, general_profile_compatibility_flag[i], general_tier_flag, and general_level_idc, respectively, in the profile_tier_level( )) syntax structure for the <delete>output layer</delete><insert>partition</insert>.

Conformance of a sub-bitstream of an <delete>output layer set</delete><insert>partition</insert> to the Stereo Main profile is indicated by general_profile_idc being equal to <insert>6</insert><delete>5</delete>or general_profile_compatibility_flag[<insert>6</insert><insert><delete>5</delete>] being equal to 1.

NOTE—When general_profile_compatibility_flag [<insert>6</insert><delete>5</delete>] is equal to 1, general_profile_compatibility_flag[<insert>1</insert><insert>/<delete>i</delete><delete>for i equal to 1</delete> should also be equal to 1.

Furthermore, in some examples of this disclosure, the following changes may be made to Paragraph G.11.2.1of MV-HEVC WD8. The text below indicates changes to a portion of the example version of Paragraph G.11.2.1 described above in this disclosure.

G.11.2.1 General tier and level limits

The condition (a) is changed as follows:

j) <delete>For each layer in the</delete><insert>The value of</insert> partition<delete>,</delete> PicSizeInSamplesY shall be less than or equal to MaxLumaPs, where MaxLumaPs is specified in Table A-1<insert>for the tier and level of the partition</insert>.

Additionally, in some examples of this disclosure, the following changes are made to Paragraph G.11.2.2 of MV-HEVC WD8. The text below indicates changes to a portion of the example version of Paragraph G.11.2.1 described above in this disclosure.

G.11.2.2 Profile-specific level limits for the Main, Main 10, and Stereo Main profiles Each partition conforming to the Stereo Main profile at a specified tier and level shall obey the following constraints for <delete>each bitstream</delete><insert>the</insert> conformance test as specified in Annex C, where "access unit" is used to denote the set of pictures contained in the partition, along with their associated non-VCL NAL units, of layers contained in the partition and that have the same output time and the CPB is understood to be the BPB:

Furthermore, as described elsewhere in accordance with one or more techniques of this disclosure, for each respective partitioning scheme of each output layer set, a VPS VUI or SEI message of a bitstream may identify an HRD parameter set for the respective partitioning scheme. The changes shown in Table 5may be made to the VPS VUI bitstream partition HRD parameters syntax structure defined in Paragraph F.7.3.2.1.6 of MV-HEVC WD8 and SHVC WD6 to implement such examples.

TABLE 5

| | Descriptor |
|---|---|
| vps_vui_bsp_hrd_parameters( ){ | |
|    vps_num_bsp_hrd_parameters_minus1 | ue(v) |
|    for( i = 0; i <= vps_num_bsp_hrd_parameters_minus1; i++ ) { | |
|      if( i > 0 ) | |
|        bsp_cprms_present_flag[ i ] | u(1) |
|      hrd_parameters( bsp_cprms_present_flag[ i ], vps_max_sub_layers_minus1 ) | |
|    } | |
|    for( h = 1; h <= NumOutputLayerSets; h++ ) { | |
|      for( i = 1; i <= num_partitioning_schemes_minus1[ h ]; i++ ) { | |
|        num_bsp_sched_combinations_minus1[ h ][ i ] | ue(v) |
|        for( j = 0; j <= num_bsp_sched_combinations_minus1[ h ][ i ]; j++ ) | |
|          for( k = 0; k < NumPartitionsInScheme[ i ]; k++ ) { | |
|            bsp_comb_hrd_idx[ h ][ i ][ j ][ k ] | ue(v) |
|            bsp_comb_sched_idx[ h ][ i ][ j ][ k ] | ue(v) |
|          } | |
|      } | |
|    } | |
| } | |

In accordance with the example of Table 5, the following changes may be made to the semantics of the VPS VUI bitstream partition HRD parameters as defined in Paragraphs F.7.4.3.1.6 of MV-HEVC WD8 and SHVC WD6.

<delete>num_bitstream_partitions[h] specifies the number of bitstream partitions for which HRD parameters are specified for the layer set with index h. layer in bsp flag[h][i][j] specifies that the layer with index j is a part of bitstream partition with index i within the layer set with index h.</delete> num_bsp_sched_combinations_minus1[h]<insert>[i]</insert> plus 1 specifies the number of combinations of delivery schedules and hrd_parameters( ) specified for bitstream partitions for <insert>the i-th partitioning scheme of</insert> the <insert>h-th output</insert> layer set <delete>with index h</delete>.

The variable SchedCombCnt[h]<insert>[i]</insert> is set equal to num_bsp_sched_combinations minus1[h]>[i]</insert>+1.

bsp_comb_hrd_idx[h][i][j]<insert>[k]</insert> specifies the index of hrd_parameters( )within the vps_vui_bsp_hrd_parameters( )syntax structure used in the <delete>i</delete><insert>j</insert>-th combination of a delivery schedule and hrd_parameters( )) specified for the <delete>bitstream</delete><insert>k-th</insert> partition <delete>with index j and</delete><insert>of the i-th partitioning scheme</insert> for the <insert>h-th output</insert> layer set <delete>with index h</delete>.

bsp_comb_sched_idx[h][i][j]<insert>[k]</insert> specifies the index of a delivery schedule within the hrd_parameters( ) syntax structure with the index bsp_comb_hrd_idx[h][i][j]<insert>[k]</insert> that is used in the <delete>i</delete><insert>j</insert>-th combination of a delivery schedule and hrd_parameters( )specified for the <delete>bitstream</delete><insert>k-th</insert> partition <delete>with index j</delete><insert>of the i-th partitioning scheme</insert> <delete>and </delete> for the <insert>h-th output</insert> layer set <delete>with index h</delete>.

Furthermore, in accordance with one or more techniques of this disclosure, the changes shown in Table 6, below, may be made to the bitstream partition HRD parameters SEI message syntax as defined in Paragraph F.14.1.5 of MV-HEVC WD8 and SHVC WD6.

TABLE 6

| | Descriptor |
|---|---|
| bsp_hrd( payloadSize ) { | |
|    sei_num_bsp_hrd_parameters_minus1 | ue(v) |
|    for( i = 0; i <= sei_num_bsp_hrd_parameters_minus1; i++ ) { | |
|      if( i > 0 ) | |
|        sei_bsp_cprms_present_flag[ i ] | u(1) |
|      hrd_parameters( sei_bsp_cprms_present_flag[ i ], nesting_max_temporal_id_plus1[ 0 ] − 1 ) | |
|    } | |
|    for( h = 0; h <= nesting_num_ops_minus1; h++ ) { | |
|      olsIdx = nesting_op_idx[ h ] | |
|      num_sei_partitioning_schemes_minus1[ olsIdx ] | ue(v) |
|      for( i = 1; i <= num_sei_partitioning_schemes_minus1[ olsIdx ]; i++ ) { | |
|        num_sei_bitstream_partitions_minus2[ olsIdx ][ i ] | ue(v) |
|        for( j = 0; j <= NumSeiBitstreamPartitions[ olsIdx ][ i ]; j++ ) | |
|          for( k = 0; k <= vps_max_layers_minus1; k++ ) | |
|            if( layer_id_included_flag[ LayerSetIdxForOutputLayerSet[ olsIdx ] ][ k ] ) | |
|              sei_layer_in_bsp_flag[ olsIdx ][ i ][ j ][ k ] | u(1) |

TABLE 6-continued

| | Descriptor |
|---|---|
|     sei_num_bsp_sched_combinations_minus1[ olsIdx ][ i ] | ue(v) |
|     for( j = 0; j <= sei_num_bsp_sched_combinations_minus1[ olsIdx ][ i ]; j++ ) | |
|         for( k = 0; k <= NumSeiBitstreamPartitions[ olsIdx ][ i ]; k++ ) { | |
|             sei_bsp_comb_hrd_idx[ olsIdx ][ i ][ j ][ k ] | ue(v) |
|             sei_bsp_comb_sched_idx[ olsIdx ][ i ][ j ][ k ] | ue(v) |
|         } | |
|     } | |
| } | |

Furthermore, in the example of Table 6, the bitstream partition nesting SEI message provides a mechanism to associate SEI messages with a bitstream partition of an output layer set. In the example of Table 6, the following changes to the bitstream partition HRD parameters SEI message semantics may be made to Paragraph F.14.2.5 of MV-HEVC WD8 and SHVC WD6.

<insert>num_sei_partitioning_schemes minus1[olsIdx] plus 1 specifies the number of partitioning schemes specified for the output layer set with index olsIdx. The value of num_sei_partitioning_schemes_minus1[olsIdx] shall be in the range of 0 to 15, inclusive.</insert>
num_sei_bitstream_partitions_minus <insert>2</insert> <delete>1</delete>[<insert>o</insert>lsIdx]<insert>[i]</insert> plus <delete>1</delete><insert>2</insert> specifies the number of bitstream partitions for which HRD parameters are specified for <insert>the i-th partitioning scheme of</insert> the <insert>output</insert> layer set with index <insert>o</insert>lsIdx. <insert>The value of num_sei_bitstream_partitions_minus1[olsIdx][i] shall be in the range of 0 to NumLayersInIdList[LayerSetIdxForOutputLayerSet[olsIdx]][9 −1, inclusive. The value of num_sei_bitstream_partitions_minus1[olsIdx][0] is inferred to be equal to 0. The value of variable NumPartitionInScheme[i][j] is derived as follow: NumSeiBitstreamPartitions [olsIdx][i]=(i==0)?1: num_sei_bitstream_partitions_minus2[i][j]+2.</insert>
sei_layer_in_bsp_flag[olsIdx][i][j]<insert>k</insert> specifies that the layer with index <delete>j</delete><insert>k</insert> is a part of bitstream partition with index <delete>i</delete><insert>j</insert> within <insert> the partitioning scheme with index i of</insert> the layer set with index olsIdx. <insert>The value of layer_included_in_partition_flag[olsIdx][0][0][k] is inferred to be equal to the value of layer_id_included_flag[LayerSetIdxForOutputLayerSet[olsIdx]][k] for k in the range from 0 to vps_max_layers_minus1, inclusive.</insert>
It is a requirement of bitstream conformance that the bitstream partition with index <delete>j</delete><insert>n</insert> shall not include direct or indirect reference layers of any layers in the bitstream partition with index <delete>i</delete><insert>m</insert> for any values of <delete>i</delete><insert>m</insert> and <delete>j</delete><insert>n</insert> in the range of 0 to <insert>N</insert><delete>n</delete><delete>um</delete><delete>_s</delete><insert>S</insert>ei<delete>e</delete>_b</delete><insert>B</insert>itstream<delete>_p</delete><insert>P</insert>artitions <delete>_minus1</delete>[<insert>o</insert>lsIdx]<insert>[i]</insert></insert><delete>, inclusive</delete>, such that <delete>i</delete><insert>m</insert> is less than <delete>j</delete><insert>n</insert>.

sei_num_bsp_sched_combinations_minus1[olsIdx]<insert>[i]</insert> plus 1 specifies the number of combinations of delivery schedules and hrd_parameters( ) specified for bitstream partitions for <insert> the partitioning scheme with index i of</insert> the <insert>output</insert> layer set with index <insert>o</insert>lsIdx.

The variable SchedCombCnt[olsIdx]<insert>[i]</insert> is set equal to sei_num_bsp_sched_combinations_minus1[olsIdx]<insert>[i]</insert>+1.

sei_bsp_comb_hrd_idx[olsIdx][i][j][<insert>k</insert>] specifies the index of hrd_parameters( )within this SEI message used in the <insert>j-th</insert> combination of a delivery schedule and hrd_parameters( ) specified for the bitstream partition with index <delete>j</delete><insert>k</insert> of the partitioning scheme with index i</insert><delete>and</delete> for the <insert>output</insert> layer set with index <insert>o</insert>lsIdx.

sei_bsp_comb_sched_idx[olsIdx][i][j][<insert>k</insert>]<insert> specifies the index of a delivery schedule within the hrd_parameters( )syntax structure with the index sei_bsp_comb_hrd_idx[olsIdx][i][j][<insert>k</insert>]</insert><insert> that is used in the <delete>i-th</delete><insert>j-th</insert>combination of a delivery schedule and hrd_parameters( )specified for the bitstream partition with index <delete>j</delete><insert>k</insert> of the partitioning scheme with index i </insert><delete>and</delete> for the <insert>output</insert> layer set with index <insert>o</insert>lsIdx.

Annex C in MV-HEVC WD8 and SHVC WD6 describes the HRD. More particularly, Paragraph C.1 of MV-HEVC WD8 and SHVC WD6 indicates that multiple tests may be needed for checking the conformance of a bitstream, which is referred to as the bitstream under test. Furthermore, Paragraph C.1 of MV-HEVC WD8 and SHVC WD6 indicate a series of steps to apply in order to check the conformance of a bitstream.

In some examples of this disclosure, the series of steps described in Paragraph C.1 of MV-HEVC WD8 and SHVC WD6 is modified in order to support the partitioning scheme described elsewhere in this disclosure. For instance, the following modifications may be made to Paragraph C.1 of MV-HEVC WD8 and SHVC WD6.

For each test, the following steps apply in the order listed:
    1. An operation point under test, denoted as TargetOp, is selected by selecting a value for TargetOutputLayerSetIdx identifying a target output layer set and selecting a target highest TemporalId value Highest- Tid. The value of TargetOutputLayerSetIdx shall be in the range of 0 to NumOutputLayerSets −1, inclusive. The value of HighestTid shall be in the range of 0 to MaxSubLayersInLayerSetMinus1[LayerSetIdx-ForOutputLayerSet[TargetOutputLa yerSetIdx]], inclusive. The variables TargetDecLayerSetIdx, TargetOptLayerIdList, and TargetDecLayerIdList are then derived as specified by Equation 8-1. The operation point under test has OptLayerIdList equal to TargetOptLayerIdList, OpLayerIdList equal to TargetDecLayerIdList, and OpTid equal to HighestTid.

2. The sub-bitstream extraction process as specified in clause 10 is invoked with the bitstream under test, HighestTid, and TargetDecLayerIdList as inputs, and the output is assigned to BitstreamToDecode. <insert>A partitioning scheme is selected from the list of partitioning schemes signalled in the active VPS for the selected output layer set. After that, for the selected partitioning scheme, a partition is selected from the list of partitions signalled in the VPS for the selected output layer set</insert>.

3. <insert>If the selected partition contains all layers of the selected output layer set, the bitstream-specific CPB operation is selected. Otherwise, the bitstream-partition-specific CPB operation is selected. The subsequent steps apply to the sub-bitstream of the selected partition, referred to as the bitstream partition under test,</insert><delete>When both the vps_vui_bsp_hrd_parameters( ) syntax structure is present in the active VPS, a partitioning scheme, denoted as TargetPartitioningScheme, is selected by selecting a value for TargetPartitioningSchemeIdx that is in the range of 1 to num_partitioning_schemes_minus1 [TargetOutputLayerSetIdx], inclusive. When and num_bitstream_partitionsnNum_pPartitions_iIn_sScheme minus1[TargetDecOutputLayerSetIdx][TargetPartitioningSchemeIdx] is greater than 1 0 1 where TargetPartitioningSchemeIdx is the index of the selected TargetPartitioningScheme that is in the range of 1 to num_partitioning_schemes_minus1 [TargetOutputLayerSetIdx] or both a bitstream partition HRD parameters SEI message is present and the SEI message contains syntax element num_sei_bitstream_partitions_in_scheme bitstream_partitions_minus1[TargetDecOutputLayerSetIdx][TargetPartitioningSche meIdx] greater than 0, either the bitstream-specific CPB operation or the bitstream-partition-specific CPB operation is selected for a conformance test, and both CPB operations shall be tested for checking the conformance of a bitstream. When the bitstream-specific CPB operation is tested, the subsequent steps apply for the bitstream under test. When the bitstream-partition-specific CPB operation is tested, the subsequent steps apply to each bitstream partition of the bitstream under test, referred to as the bitstream partition under test. When the bitstream-partition-specific CPB operation is tested and the input to the HRD is a bitstream, the bitstream partitions are</delete> derived with the demultiplexing process for deriving a bitstream parition in subclause C.6. <insert>When the bitstream-parition-specific CPB operation is selected, bitstream partitions of the other partitions of the same partitioning scheme of the selected output layer set are assumed to be decoded by decoding capablitilies other than the HRD but available to the HRD as scheduled according to the HRD parameters of those partitions.</insert>

4. The hrd_parameters( )syntax structure and the sub_layer_hrd_parameters( )syntax structure applicable to TargetOp are selected as follows:
   If the bitstream-specific CPB operation is tested, the following applies:
   If TargetDecLayerIdList contains all nuh_layer_id values present in the bitstream under test, the hrd_parameters( )syntax structure in the active SPS for the base layer (or provided through an external means not specified in this Specification) is selected.
   Otherwise, the hrd_parameters( )syntax structure in the active VPS (or provided through some external means not specified in this Specification) that applies to TargetOp is selected.
   Otherwise, the hrd_parameters( )syntax structure is selected as follows:
   Either one of the hrd_parameters( )syntax structures in the following conditions can be selected, if both of the following conditions are true:
   The vps_vui_bsp_hrd_parameters( )syntax structure is present in the active VPS (or is available through some external means not specified in this Specification) and contains a hrd_parameters( )syntax structure thatapplies to TargetOp,<insert>, to TargetPartitioningScheme</insert> and to the bitstream partition under test.
   A bitstream partition HRD parameters SEI message that is included in a scalable nesting SEI message that applies to TargetOp and contains a hrd_parameters( )syntax structure that applies to TargetOp, <insert>, to TargetPartitioningScheme</insert> and to the bitstream partition under test is present (or is available through some external means not specified in this Specification).
   Otherwise, if the vps__vui_bsp_hrd_parameters ( )syntax structure is present in the active VPS (or is available through some external means not specified in this Specification) and contains a hrd_parameters( )syntax structure that applies to TargetOp,<insert>, to TargetPartioningScheme</insert> and the bitstream partition under test, that hrd_parameters( )syntax structure is selected.
   Otherwise, a hrd_parameters( )syntax structure that applies to the bitstream partition under test in the bitstream partition HRD parameters SEI message that is included in a scalable nesting SEI message that applies to TargetOp <insert>and to TargetPartioningScheme</insert> shall be present (or shall be available through some external means not specified in this Specification) and is selected.
   Within the selected hrd_parameters( )syntax structure, if BitstreamToDecode is a Type I bitstream, the sub_layer_hrd_parameters(HighestTid) syntax structure that immediately follows the condition "if(vcl_hrd_parameters_present_flag)" is selected and the variable NalHrdModeFlag is set equal to 0; otherwise (BitstreamToDecode is a Type II bitstream), the sub_layer_hrd_parameters(HighestTid) syntax structure that immediately follows either the condition "if(vcl_hrd_parameter_rspresent_flag)" (in this case the variable NalHrdModeFlag is set equal to 0) or the condition "if (nal_hrd_parameters_present_flag)" (in this case the variable NalHrdModeFlag is set equal to 1) is selected. When BitstreamToDecode is a Type II bitstream and NalHrdModeFlag is equal to 0, all non-VCL NAL units except filler data NAL units, and all leading_zero_8bits, zero_byte, start_code_prefix_one_3bytes, and trailing_zero_8bits syntax elements that form a byte stream from the NAL unit stream (as specified in Annex B), when present, are discarded from BitstreamToDecode, and the remaining bitstream is assigned to BitstreamToDecode.

5. An access unit associated with a buffering period SEI message (present in BitstreamToDecode or available through external means not specified in this Specification) applicable to TargetOp is selected as the HRD initialization point and referred to as access unit 0. An applicable buffering period SEI message is available through external means not specified in this Specification or is selected from access unit 0 as follows:
   If the bitstream-specific CPB operation is tested, the following applies:
      If TargetDecLayerIdList contains all nuh_layer_id values present in the bitstream under test, a non-nested buffering period SEI message is selected.
      Otherwise, a buffering period SEI message included in the scalable nesting SEI message with bitstream_subset_flag equal to 1 and applicable to TargetOp is selected.
   Otherwise, a buffering period SEI message included in the bitstream partition nesting SEI message applicable to the bitstream partition under test is selected.
   The variable MultiLayerCpbOperationFlag is derived as follows:
      If the selected buffering period SEI message is non-nested or is included in a scalable nesting SEI message that applies only to the sub-bitstream that contains only the base layer, MultiLayerCpbOperationFlag is set equal to 0.
      Otherwise, MultiLayerCpbOperationFlag is set equal to 1.

6. For each access unit in BitstreamToDecode starting from access unit 0, the buffering period SEI message (present in BitstreamToDecode or available through external means not specified in this Specification) that is associated with the access unit and applies to TargetOp is selected, the picture timing SEI message (present in BitstreamToDecode or available through external means not specified in this Specification) that is associated with the access unit and applies to TargetOp is selected, and when SubPicHrdFlag is equal to 1 and sub_pic cpb_params_in_pic_timing_sei_flag is equal to 0, the decoding unit information SEI messages (present in BitstreamToDecode or available through external means not specified in this Specification) that are associated with decoding units in the access unit and apply to TargetOp are selected as follows:
   If the bitstream-specific CPB operation is tested, the following applies:
      If TargetDecLayerIdList contains all nuh_layer_id values present in the bitstream under test, non-nested buffering period, picture timing and decoding unit information SEI messages are selected.
      Otherwise, buffering period, picture timing and decoding unit information SEI messages included in the scalable nesting SEI message with bitstream_subset_flag equal to 1 and applicable to TargetOp are selected.
   Otherwise, buffering period, picture timing and decoding unit information SEI messages included in the bitstream partition nesting SEI message and applicable to the bitstream partition under test are selected.

7. A value of SchedSelIdx is selected as follows:
   If the bitstream-specific CPB operation is tested, the selected SchedSelIdx shall be in the range of 0 to cpb_cnt_minus1[HighestTid], inclusive, where cpb_cnt_minus1[HighestTid] is found in the sub_layer_hrd_parameters(HighestTid ) syntax structure as selected above.
   Otherwise (the bitstream-partition-specific CPB operation is tested), a SchedSelComb Idx is selected for the bitstream under test and used for each bitstream partition under test. The following applies:
      If the vps_vui_bsp_hrd_parameters( )syntax structure is present in the active VPS (or made available through external means not specified in this Specification) and contains the selected hrd_parameters( ) syntax structure that applies to TargetOp and the bitstream partition under test, the selected SchedSelCombIdx shall be in the range of 0 to num_bsp_sched_combinations_minus1[TargetOutput <delete>Dec</delete> LayerSetIdx][<insert>T argetPartitioningSchemeIdx</insert>], inclusive, and the selected SchedSelIdx shall be equal to bsp_comb_sched_idx[TargetOutput<delete>Dec</delete> LayerSetId x] [<insert> TargetPartitioningSchemeIdx</insert >][SchedSelCombIdx][j] where j is the index of the bitstream partition under test. <insert>, where TargetPartitioningSchemeIdx is the index of the selected Target PartitioningScheme that is in the range of 1 to num partitioning schemes minus 1[TargetOutputLayerSetIdx]</insert>
      Otherwise, the selected SchedSelCombIdx shall be in the range of 0 to sei_num_bsp_sched_combinations_minus1[Target <insert>Output</insert><delete>Dec</delete>LayerSetIdx][<insert>TargetPartitioningSchemeIdx</insert>], inclusive, and the selected SchedSelIdx shall be equal to sei_bsp_comb_sched_idx[Target <insert>Output</insert><delete>Dec</delete>LayerSetIdx] [<insert>TargetPartitioningSchemeIdx</insert>] [SchedSelCombIdx][j] of the bitstream partition HRD parameters SEI message applicable to TargetOp where j is the index of the bitstream partition under test.

. . .
The HRD operates as follows:
  The HRD is initialized at decoding unit 0, with the CPB, each sub-DPB of the DPB, and each BPB being set to be empty (the sub-DPB fullness for each sub-DPB is set equal to 0).
    NOTE 6—After initialization, the HRD is not initialized again by subsequent buffering period SEI messages.
  For the bitstream-specific CPB operation, data associated with decoding units that flow into the CPB according to a specified arrival schedule are delivered by the HSS. For the bitstream-partition-specific CPB operation, data associated with decoding units that flow into the BPB according to a specified arrival schedule are delivered by an HBPS.
  When the bitstream-partition-specific CPB operation is used, each bitstream partition with index j is processed as specified in clause C.2 with the HSS replaced by the HPBS and with SchedSelIdx equal to bsp_comb_sched_idx[TargetOutput<delete>Dec</delete>LayerSetIdx] [<insert>TargetPartitioningSchemeIdx</insert>][SchedSelCombIdx][j], if vps_vui_bsp_hrd_parameters( )syntax structure is present in the active VPS or is available through some external means not specified in this Specification), or equal to sei_bsp_comb_sched_idx[TargetOutput[<delete>Dec</delete>LayerSetIdx][<insert>TargetPartitioningSchemeIdx</insert>[]SchedSelCombIdx][j] of the bitstream partition HRD parameters SEI message applicable to TargetOp, otherwise.
  The data associated with each decoding unit are removed and decoded instantaneously by the instantaneous decoding process at the CPB removal time of the decoding unit.
  Each decoded picture is placed in the DPB.
  A decoded picture is removed from the DPB when it becomes no longer needed for inter prediction reference and no longer needed for output.

As shown above, when an HRD tests each partition of each partitioning scheme, based on a selected partition of a particular partitioning scheme of the one or more partitioning schemes not containing all layers of the output layer set, the HRD may apply, a partition-specific coded picture buffer (CPB) operation. For instance, the HRD may obtain, from a bitstream scheduling parameters (BSP) syntax structure within the VUI, one or more HRD parameter sets. In a similar example, the HRD may obtain, from a BSP syntax structure within the SEI message, one or more HRD parameter sets. For each respective partitioning scheme of the one or more partitioning schemes of the output layer set, for each respective combination in a set of one or more schedule combinations for the respective partitioning scheme, for each respective partition of the respective partitioning scheme, the HRD may obtain, from the BSP syntax structure, a respective syntax element (e.g., bsp_comb_hrd_idx) specifying an HRD parameter set for the respective partition in the BSP syntax structure and a respective syntax element specifying a delivery schedule (e.g., sei_bsp_comb_sched_idx).

In corresponding examples, video encoder 20 includes, in a BSP syntax structure within the VUI, one or more HRD parameter sets. For each respective combination in a set of one or more schedule combinations for a respective partitioning scheme, for each respective partition of the respective partitioning scheme, video encoder 20 may include, in the BSP syntax structure, a respective syntax element specifying an HRD parameter set for the respective partition in the BSP syntax structure and a respective syntax element specifying a delivery schedule. In another example, video encoder 20 includes, in a BSP syntax structure within the SEI message, one or more HRD parameter sets. For each respective combination in a set of one or more schedule combinations for a respective partitioning scheme, for each respective partition of the respective partitioning scheme, video encoder 20 includes, in the BSP syntax structure, a respective syntax element specifying an HRD parameter set for the respective partition in the BSP syntax structure and a respective syntax element specifying a delivery schedule.

Furthermore, in some examples, Paragraph C.4 of MV-HEVC WD8 and SHVC WD6 is modified as follows:
  The following sentence is removed:
  The bitstream is tested by the HRD for conformance as specified in subclause C.1.
  The following sentence is added:
  <insert>The sub-bitstream of each partitioning scheme is tested by the HRD for conformance as specified in the subclause C.1</insert>.

As indicated above, a video processing device may be able to determine whether a multi-layer video decoder is able to decode a bitstream based on a list of triplets of profile, tier, and level specified for the multi-layer decoder. The following text is an example of how this may be implemented.

G.11.3 Decoders capabilities
  <insert>Decoders conforming to a set of profile, tier and level triplets denoted by ($P_i$, $T_i$, $L_i$) for i in the range of 0 to q−1, inclusive, where q is a positive integer, shall be capable of decoding all sub-bitstreams of output layer sets with at least one partitioning scheme with p partitions for which all of the following conditions apply:
    Let the variable Partition[j] for j in the range of 0 to p−1, inclusive, where p is less than or equal to q, denote the j-th partition in the partitioning scheme.
    The union of layers that are contained in partitions from Partition[0] to Partition[p−1], inclusive, represents all layers in the output layer set.
    Let variable PartitionAssignment[j] for j in the range of 0 to p−1, inclusive, is used to indicate the decoding assignment of profile, tier and level triples ($P_{PartitionAssignment[j]}$, $T_{PartitionAssignment[j]}$, $L_{PartitionAssignment[j]}$) to Partition[j]. The value of PartitionAssignment[j] is derived as follows:
    Let UnassignedProfileTierLevelTriples be an array of profile, tier and level triples with UnassignedProfileTierLevelTriples[i] is equal ($P_i$, $T_i$, $L_i$) for i in the range of 0 to q−1, inclusive.
    The following applies:
  for(j=0; j<p; j++)
    PartitionAssignment[j]=−1
    if(there is a non-empty UnassignedProfileTierLevelTriples[x] such that
      general_profile_idc of the Partition[j] is equal to $P_x$, or general_profile_compatibility_flag[$P_x$]
      is equal to 1 for Partition[j] and
      general_tier_flag of Partition[j] represents a tier lower than or equal to $T_x$ and
      general_level_idc of Partition[j] represents a level represents a level lower than or equal to $L_x$) {

PartitionAssignment[j]=x
Empty UnassignedProfileTierLevelTriples[x]
}
There shall be no entry in PartitionAssignment[j] that is equal to −1 j in the range of 0 to p −1, inclusive</insert>.

Figure 5A:
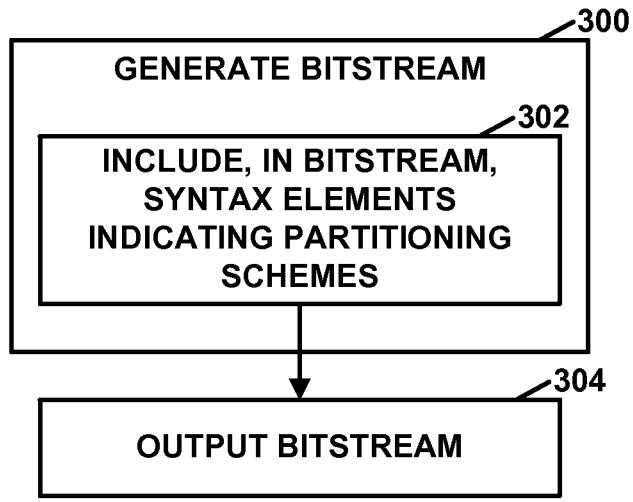
FIG. 5A is a flowchart illustrating an example operation of a video encoder, in accordance with a technique of this disclosure.

FIG. 5A is a flowchart illustrating an example operation of video encoder 20, in accordance with a technique of this disclosure. In the example of FIG. 5A, video encoder 20 generates a bitstream that comprises an encoded representation of the video data (300). The bitstream comprise a plurality of layers. As part of generating the bitstream, video encoder 20 includes, in the bitstream, one or more syntax elements indicating one or more partitioning schemes (302). For each respective partitioning scheme of the one or more partitioning schemes, the respective partitioning scheme specifies a respective set of disjoint partitions whose union forms an output layer set, wherein each respective partition of the respective set of disjoint partitions contains one or more layers, the output layer set consisting of all layers of the plurality of layers or a proper subset of the plurality of layers.

In some examples, as part of generating the bitstream, for each respective partition of each respective partitioning scheme of the one or more partitioning schemes, video encoder 20 may indicate, in the bitstream, a respective syntax element indicating a profile, a tier, and a level for the respective partition.

Furthermore, in some examples, video encoder 20 may include, in the bitstream, syntax elements indicating a plurality of output layer sets, the plurality of output layers sets including the first output layer set. For each respective output layer set of the plurality of output layer sets, video encoder 20 may include, in the bitstream, syntax elements indicating one or more partitioning schemes for the respective output layer set.

In some examples, as part of signaling the one or more syntax elements indicating the one or more partitioning schemes, for each respective partitioning scheme of the one or more partitioning schemes, for each respective partition of the respective partitioning scheme, for each respective layer of the output layer set, video encoder 20 may include, in the bitstream, a syntax element indicating whether the respective layer is included in the respective partition.

Furthermore, in the example of FIG. 5A, video encoder 20 outputs the bitstream (304). For example, video encoder 20 may output the bitstream to an output interface, such as output interface 22. In some examples, video encoder 20 may output the bitstream to one or more computer-readable data storage media for storage.

Figure 5B:
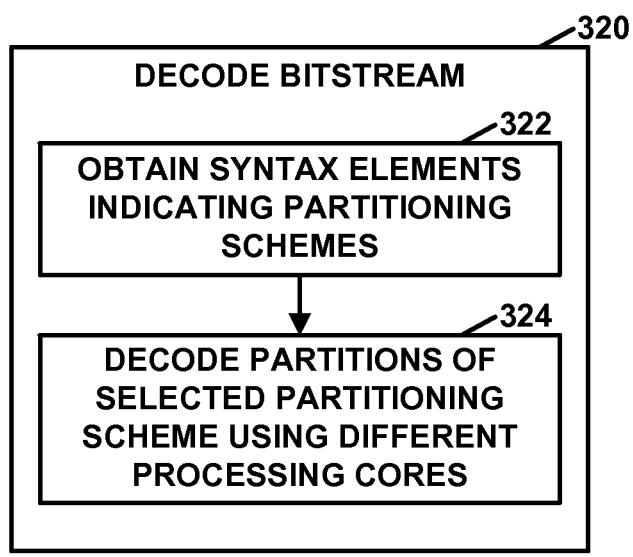
FIG. 5B is a flowchart illustrating an example operation of a video decoder, in accordance with a technique of this disclosure.

FIG. 5B is a flowchart illustrating an example operation of video decoder 30, in accordance with a technique of this disclosure. In the example of FIG. 5B, video decoder 30 decodes a bitstream that comprises an encoded representation of the video data, the bitstream comprising a plurality of layers (320). As part of decoding the bitstream, video decoder 30 obtains, from the bitstream, one or more syntax elements indicating one or more partitioning schemes (322). For each respective partitioning scheme of the one or more partitioning schemes, the respective partitioning scheme specifies a respective set of disjoint partitions whose union forms an output layer set. Each respective partition of the respective set of disjoint partitions contains one or more of the layers. The output layer set may consist of all layers of the plurality of layers or a proper subset of the plurality of layers. In some examples, as part of obtaining the one or more syntax elements, for each respective partitioning scheme of the one or more partitioning schemes, for each respective partition of the respective partitioning scheme, for each respective layer of the output layer set, video decoder 30 may obtain, from the bitstream, a syntax element indicating whether the respective layer is included in the respective partition.

Furthermore, as part of decoding the bitstream, video decoder 30 decodes each of the partitions of a particular partitioning scheme using different processing cores in a plurality of hardware cores, the particular partitioning scheme being one of the one or more partitioning schemes (324). In some examples, as part of decoding the bitstream, video decoder 30 may, for each respective partition of each respective partitioning scheme of the one or more partitioning schemes, obtain, from the bitstream, a respective syntax element that indicates respective profile, tier, and level (PTL) information for the respective partition.

In some examples, video decoder 30 may determine, based on the PTL information for partitions of the partitioning schemes, the particular partitioning scheme from the one or more partitioning schemes. Furthermore, in such examples, video decoder 30 may decode each respective partition of the particular partitioning scheme using a respective one of the hardware cores, wherein each respective one of the hardware cores implements a respective single-layer decoder. In some examples, at least a first hardware core of the plurality of hardware cores supports a different profile, tier, or level from a second hardware core of the plurality of hardware cores. In other examples, at least a first hardware core of the plurality of hardware cores and a second, different hardware core of the plurality of hardware cores support the same set of profiles, tiers, and levels.

In some examples, when video decoder 30 decodes the bitstream, video decoder 30 obtains, from the bitstream, syntax elements indicating a plurality of output layer sets, the plurality of output layers sets including the first output layer set. In such examples, for each respective output layer set of the plurality of output layer sets, video decoder 30 may obtain, from the bitstream, syntax elements indicating one or more partitioning schemes for the respective output layer set.

Figure 6A:
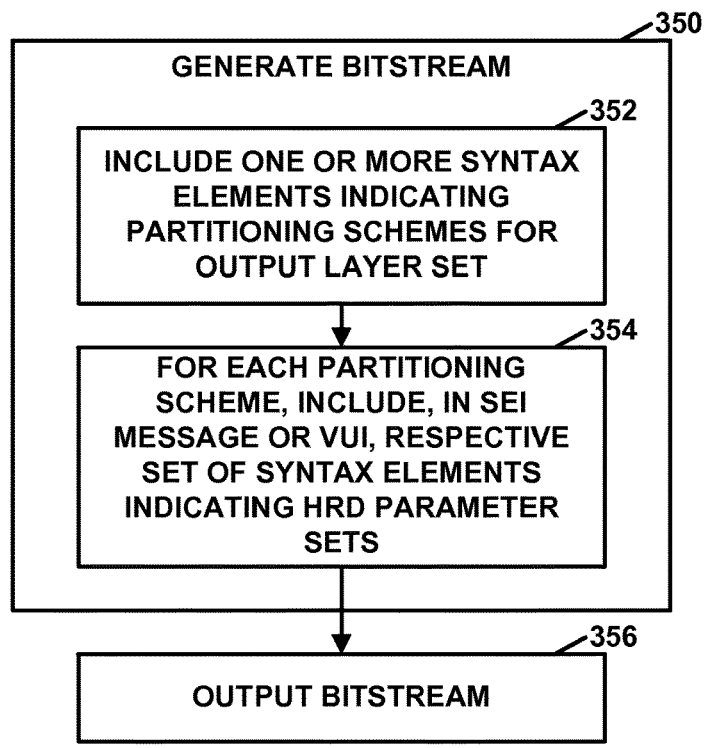
FIG. 6A is a flowchart illustrating an example operation of a video encoder, in accordance with a technique of this disclosure.

FIG. 6A is a flowchart illustrating an example operation of video encoder 20, in accordance with a technique of this disclosure. In the example of FIG. 6A, video encoder 20 generates a bitstream that comprises an encoded representation of the video data (350). The bitstream comprises a plurality of layers. As part of generating the bitstream, video encoder 20 includes, in the bitstream, one or more syntax elements indicating one or more partitioning schemes for an output layer set (352). In the example of FIG. 6A, the output layer set consists of all layers of the plurality of layers or a proper subset of the plurality of layers. Furthermore, for each respective partitioning scheme of the one or more partitioning schemes, the respective partitioning scheme specifies a division of the output layer set into one or more partitions, wherein each layer in the output layer set belongs to exactly one partition in the respective partitioning scheme. Additionally, as part of generating the bitstream, for each respective partitioning scheme of the one or more partitioning schemes, video encoder 20 includes, in a SEI message in the bitstream or VUI in a VPS in the bitstream, a respective set of syntax elements (e.g., bsp_comb_hrd_idx syntax elements) indicating HRD parameter sets for the respective partitioning scheme (354). Video encoder 20 outputs the bitstream (356). For example, video encoder 20 may output the bitstream to an output interface, such as output interface 22. In some examples, video encoder 20 may output the bitstream to one or more computer-readable data storage media for storage.

In some examples, as part of including the respective set of syntax elements indicating the HRD parameter sets for each of the one or more partitioning schemes comprises, video encoder 20 may include, in a bitstream scheduling parameters (BSP) syntax structure within the VUI, one or more HRD parameter sets. Furthermore, in such examples, for each respective combination in a set of one or more schedule combinations for the respective partitioning scheme, for each respective partition of the respective partitioning scheme, video encoder 20 may include, in the BSP syntax structure, a respective syntax element specifying an HRD parameter set for the respective partition in the BSP syntax structure and a respective syntax element specifying a delivery schedule.

In some examples, as part of including the respective set of syntax elements indicating the HRD parameter sets for each of the one or more partitioning schemes comprises, video encoder 20 may include, in a bitstream scheduling parameters (BSP) syntax structure within the SEI message, one or more HRD parameter sets. Furthermore, in such examples, for each respective combination in a set of one or more schedule combinations for the respective partitioning scheme, for each respective partition of the respective partitioning scheme, video encoder 20 may include, in the BSP syntax structure, a respective syntax element specifying an HRD parameter set for the respective partition in the BSP syntax structure and a respective syntax element specifying a delivery schedule.

Figure 6B:
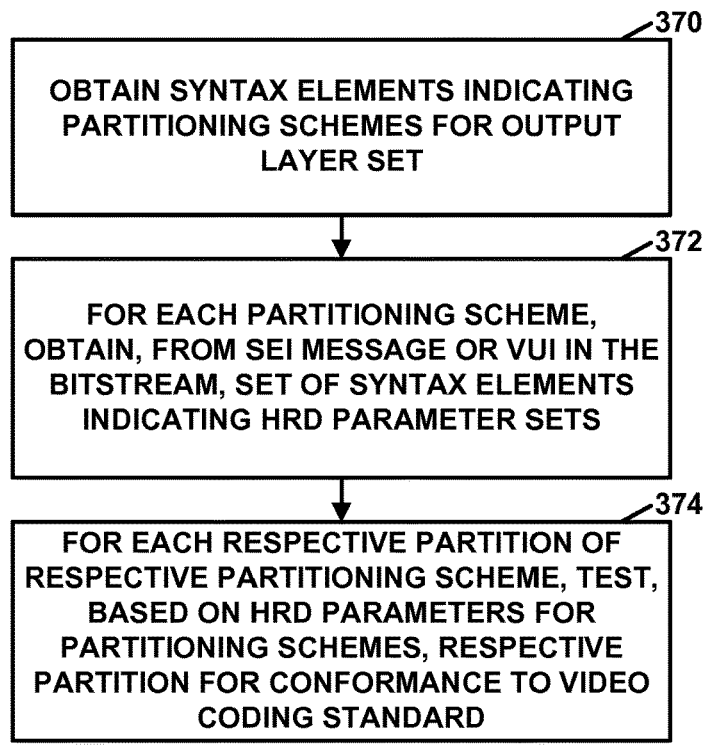
FIG. 6B is a flowchart illustrating an example operation of a video decoder, in accordance with a technique of this disclosure.

FIG. 6B is a flowchart illustrating an example operation of video decoder 30, in accordance with a technique of this disclosure. In the example of FIG. 6B, video decoder 30 obtains, from a bitstream that comprises an encoded representation of video data, one or more syntax elements indicating one or more partitioning schemes for an output layer set (370). In the example of FIG. 6B, the output layer set consists of all layers of the plurality of layers or a proper subset of the plurality of layers. For each respective partitioning scheme of the one or more partitioning schemes, the respective partitioning scheme specifies a division of the output layer set into one or more partitions, wherein each layer in the output layer set belongs to exactly one partition in the respective partitioning scheme.

Furthermore, in the example of FIG. 6B, for each respective partitioning scheme of the one or more partitioning schemes, video decoder 30 obtains, from a SEI message in the bitstream or VUI in a VPS in the bitstream, a respective set of syntax elements (e.g., bsp_comb_hrd_idx syntax elements) indicating HRD parameter sets for the respective partitioning scheme (372).

In some examples, as part of obtaining a respective set of syntax elements indicating HRD parameter sets for the respective partitioning scheme, video decoder 30 obtains, from a bitstream scheduling parameters (BSP) syntax structure within the VUI, one or more HRD parameter sets. In such examples, for each respective combination in a set of one or more schedule combinations for the respective partitioning scheme, for each respective partition of the respective partitioning scheme, video decoder 30 may obtain, from the BSP syntax structure, a respective syntax element specifying an HRD parameter set for the respective partition in the BSP syntax structure and a respective syntax element specifying a delivery schedule.

In some examples, as part of obtaining a respective set of syntax elements indicating HRD parameter sets for the respective partitioning scheme, video decoder 30 obtains, from a bitstream scheduling parameters (BSP) syntax structure within the SEI message, one or more HRD parameter sets. In such examples, for each respective combination in a set of one or more schedule combinations for the respective partitioning scheme, for each respective partition of the respective partitioning scheme, video decoder 30 may obtain, from the BSP syntax structure, a respective syntax element specifying an HRD parameter set for the respective partition in the BSP syntax structure and a respective syntax element specifying a delivery schedule.

For each respective partition of the respective partitioning scheme, video decoder 30 tests, based on the HRD parameters for the respective partitioning scheme, the respective partition for conformance (374). In some examples, as part of testing the sub-bitstreams, video decoder 30 applies, based on a selected partition of a particular partitioning scheme of the one or more partitioning schemes not containing all layers of the output layer set, a partition-specific CPB operation. In some examples, testing the conformance of a particular partition assumes that the decoded pictures and other necessary information from the direct and indirect reference layers of the layers in the partition, and that are not contained in the particular partition, are available at the time of decoding the pictures of the layers in the particular partition.

Figure 7:
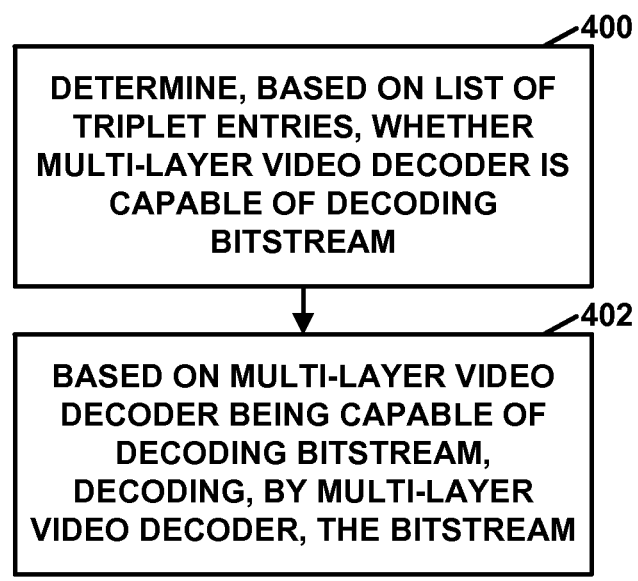
FIG. 7 is a flowchart illustrating an example operation of a video decoder, in accordance with a technique of this disclosure.

FIG. 7 is a flowchart illustrating an example operation of video decoder 30, in accordance with a technique of this disclosure. In the example of FIG. 7, video decoder 30 determines, based on a list of triplet entries, whether video decoder 30 (i.e., a multi-layer video decoder) is capable of decoding a bitstream that comprises an encoded representation of multi-layer video data (400). In some examples, the number of triplet entries in the list is less than or equal to a number of single-layer decoders in the multi-layer video data. In some examples, a single hardware core of video decoder 30 may decode multiple layers. Each respective triplet entry in the list of triplet entries indicates a profile, a tier, and a level for a respective single-layer decoder in the multi-layer video decoder. Based on the multi-layer video decoder being capable of decoding the bitstream, video decoder 30 decodes the bitstream (402).

In some examples, video decoder 30 obtains, from the bitstream, one or more syntax elements that indicate one or more partitioning schemes. For each respective partitioning scheme of the one or more partitioning schemes, the respective partitioning scheme specifies a respective set of disjoint partitions whose union forms an output layer set. Each respective partition of the respective set of disjoint partitions contains one or more of the layers, the output layer set consisting of all layers of the plurality of layers or a proper subset of the plurality of layers. As part of determining whether the multi-layer video decoder is capable of decoding the bitstream, video decoder 30 may determine, based on a condition being satisfied, that the multi-layer video decoder is capable of decoding the bitstream. In such examples, the condition is satisfied based on there being a suitable partitioning scheme in the one or more partitioning schemes. Furthermore, in such examples, for each respective partition of the suitable partitioning scheme, one of the single-layer decoders can be assigned for decoding the respective partition. In some examples, as part of determining that the multi-layer video decoder is capable of decoding the bitstream, for each respective partition of the suitable partitioning scheme. based on the following conditions being met, the multi-layer video decoder may determine that the respective partition can be assigned to one of the single-layer decoders: a level associated with the single-layer decoder is greater than or equal to a level signaled for the respective partition, a tier associated with the single-layer decoder is greater than or equal to a tier signaled for the respective partition, and a profile associated with the respective partition is such that the single-layer decoder supports decoding of the profile.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of testing conformance of a bitstream, the method comprising:
    decoding the bitstream, the bitstream comprising an encoded representation of video data, wherein decoding the bitstream comprises:
        obtaining, from the bitstream, a video parameter set (VPS), wherein an output layer set is signaled in the VPS and the VPS includes a syntax element indicating a number of partitioning schemes in a list of partitioning schemes for the output layer set, the list of partitioning schemes for the output layer set including a plurality of different partitioning schemes for the output layer set, wherein:
            the bitstream comprises a plurality of layers, Network Access Layer (NAL) units of the bitstream having different layer identifiers belonging to different layers of the plurality of layers, and
            for each respective partitioning scheme of the plurality of partitioning schemes for the output layer set, the respective partitioning scheme is a way of dividing the output layer set into a respective set of one or more partitions that is different from ways of dividing the output layer set of other partitioning schemes of the plurality of partitioning schemes, each of the one or more partitions containing one or more of the layers, the VPS including a respective syntax element for the respective partitioning scheme indicating a total number of partitions in the respective set of partitions, and each layer in the output layer set belonging to exactly one partition in the respective partitioning scheme; and
        for each respective partitioning scheme of the plurality of partitioning schemes, obtaining, from a Supplemental Enhancement Information (SEI) message in the bitstream or video usability information (VUI) in the VPS, a respective set of syntax elements indicating hypothetical reference decoder (HRD) parameter sets for the respective partitioning scheme.

2. The method of claim 1, further comprising: for each respective partition of each respective partitioning scheme of the plurality of partitioning schemes, based on the respective partition not containing all layers of the output layer set, applying a partition-specific coded picture buffer (CPB) operation.

3. The method of claim 1, wherein obtaining the respective set of syntax elements indicating the HRD parameter sets for the respective partitioning scheme comprises:
    obtaining, from a bitstream scheduling parameters (BSP) syntax structure within the VUI, one or more HRD parameter sets; and
    for each respective combination in a set of one or more schedule combinations for the respective partitioning scheme:

for each respective partition of the respective partitioning scheme:
obtaining, from the BSP syntax structure, a respective syntax element specifying, for the respective partition, one of the HRD parameter sets in the BSP syntax structure; and
obtaining, from the BSP syntax structure, a respective syntax element specifying a delivery schedule.

4. The method of claim 1, wherein obtaining the respective set of syntax elements indicating the HRD parameter sets for the respective partitioning scheme comprises:
obtaining, from a bitstream scheduling parameters (BSP) syntax structure within the SEI message, one or more HRD parameter sets; and
for each respective combination in a set of one or more schedule combinations for the respective partitioning scheme:
for each respective partition of the respective partitioning scheme:
obtaining, from the BSP syntax structure, a respective syntax element specifying, for the respective partition, one of the HRD parameter sets in the BSP syntax structure; and
obtaining, from the BSP syntax structure, a respective syntax element specifying a delivery schedule.

5. The method of claim 1, wherein conformance of the bitstream is defined based on conformance of all of the partitions of each of the plurality of partitioning schemes.

6. The method of claim 1, wherein, for each respective partition of each respective partitioning scheme of the plurality of partitioning schemes, testing the conformance of the respective partition assumes that decoded pictures and other necessary information from direct and indirect reference layers of the layers in the respective partition, and that are not contained in the respective partition, are available at the time of decoding the pictures of the layers in the respective partition.

7. A device that tests conformance of a bitstream, the device comprising:
a memory configured to store video data, the bitstream comprising an encoded representation of the video data; and
one or more processors configured to:
obtain, from the bitstream, a video parameter set (VPS), wherein an output layer set is signaled in the VPS and the VPS includes a syntax element indicating a number of partitioning schemes in a list of partitioning schemes for the output layer set, the list of partitioning schemes for the output layer set including a plurality of different partitioning schemes for the output layer set, wherein:
the bitstream comprises a plurality of layers, Network Access Layer (NAL) units of the bitstream having different layer identifiers belonging to different layers of the plurality of layers, and;
for each respective partitioning scheme of the plurality of partitioning schemes for the output layer set, the respective partitioning scheme is a way of dividing the output layer set into a respective set of one or more partitions that is different from ways of dividing the output layer set of other partitioning schemes of the plurality of partitioning schemes, each of the one or more partitions containing one or more of the layers, the VPS including a respective syntax element for the respective partitioning scheme indicating a total number of partitions in the respective set of partitions, and each layer in the output layer set belonging to exactly one partition in the respective partitioning scheme; and
for each respective partitioning scheme of the one or more partitioning schemes, obtain, from a Supplemental Enhancement Information (SEI) message in the bitstream or video usability information (VUI) in the VPS, a respective set of syntax elements indicating hypothetical reference decoder (HRD) parameter sets for the respective partitioning scheme.

8. The device of claim 7, wherein the one or more processors are configured such that, based on the respective partition not containing all layers of the output layer set, the one or more processors apply a partition-specific coded picture buffer (CPB) operation.

9. The device of claim 7, wherein the one or more processors are configured such that, as part of obtaining the respective set of syntax elements indicating the HRD parameter sets for the respective partitioning scheme, the one or more processors:
obtain, from a bitstream scheduling parameters (BSP) syntax structure within the VUI, one or more HRD parameter sets; and
for each respective combination in a set of one or more schedule combinations for the respective partitioning scheme:
for each respective partition of the respective partitioning scheme:
obtain, from the BSP syntax structure, a respective syntax element specifying, for the respective partition, one of the HRD parameter sets in the BSP syntax structure; and
obtain, from the BSP syntax structure, a respective syntax element specifying a delivery schedule.

10. The device of claim 7, wherein the one or more processors are configured such that, as part of obtaining the respective set of syntax elements indicating the HRD parameter sets for the respective partitioning scheme, the one or more processors:
obtain, from a bitstream scheduling parameters (BSP) syntax structure within the SEI message, one or more HRD parameter sets; and
for each respective combination in a set of one or more schedule combinations for the respective partitioning scheme:
for each respective partition of the respective partitioning scheme:
obtain, from the BSP syntax structure, a respective syntax element specifying, for the respective partition, one of the HRD parameter sets in the BSP syntax structure; and
obtain, from the BSP syntax structure, a respective syntax element specifying a delivery schedule.

11. The device of claim 7, wherein conformance of the bitstream is defined based on conformance of all of the partitions of each of the plurality of partitioning schemes.

12. The device of claim 7, wherein, for each respective partition of each respective partitioning scheme of the plurality of partitioning schemes, testing the conformance of the respective partition assumes that decoded pictures and other necessary information from direct and indirect reference layers of the layers in the respective partition, and that are not contained in the respective partition, are available at the time of decoding the pictures of the layers in the respective partition.

13. The device of claim 7, wherein the device comprises at least one of:
an integrated circuit;
a microprocessor; or
a wireless communication device.

14. The device of claim 7, further comprising a display configured to display decoded pictures of the video data.

15. A device for encoding video data, the device comprising:
one or more computer-readable storage media configured to store the video data; and
one or more processors configured to:
generate a bitstream that comprises an encoded representation of the video data, the bitstream comprising a plurality of layers, Network Access Layer (NAL) units of the bitstream having different layer identifiers belonging to different layers of the plurality of layers, wherein the one or more processors are configured such that, as part of generating the bitstream, the one or more processors:
include, in the bitstream, a video parameter set (VPS), wherein an output layer set is signaled in the VPS and the VPS includes a syntax element indicating a number of partitioning schemes in a list of partitioning schemes for the output layer set, the list of partitioning schemes for the output layer set including a plurality of different partitioning schemes for the output layer set,
wherein for each respective partitioning scheme of the plurality of partitioning schemes, the respective partitioning scheme is a way of dividing the output layer set into a respective set of one or more partitions that is different from ways of dividing the output layer set of other partitioning schemes of the plurality of partitioning schemes, each of the one or more partitions containing one or more of the layers, the VPS including a respective syntax element for the respective partitioning scheme indicating a total number of partitions in the respective set of partitions, and each layer in the output layer set belonging to exactly one partition in the respective partitioning scheme; and
for each respective partitioning scheme of the plurality of partitioning schemes for the output layer set, include, in a Supplemental Enhancement Information (SEI) message in the bitstream or video usability information (VUI) in the VPS, a respective set of syntax elements indicating hypothetical reference decoder (HRD) parameter sets for the respective partitioning scheme; and output the bitstream.

16. The device of claim 15, wherein the one or more processors are configured such that, as part of including the respective set of syntax elements indicating the respective HRD parameter sets for the respective partitioning scheme, the one or more processors:
include, in a bitstream scheduling parameters (BSP) syntax structure within the VUI, one or more HRD parameter sets; and
for each respective combination in a set of one or more schedule combinations for the respective partitioning scheme:
for each respective partition of the respective partitioning scheme:
include, in the BSP syntax structure, a respective syntax element specifying, for the respective partition, one of the HRD parameter sets in the BSP syntax structure; and
include, in the BSP syntax structure, a respective syntax element specifying a delivery schedule.

17. The device of claim 15, wherein the one or more processors are configured such that, as part of including the respective set of syntax elements indicating the respective HRD parameter sets for the respective partitioning scheme, the one or more processors:
include, in a bitstream scheduling parameters (BSP) syntax structure within the SEI message, one or more HRD parameter sets; and
for each respective combination in a set of one or more schedule combinations for the respective partitioning scheme:
for each respective partition of the respective partitioning scheme:
include, in the B SP syntax structure, a respective syntax element specifying, for the respective partition, one of the HRD parameter sets in the BSP syntax structure, and
include, in the B SP syntax structure, a respective syntax element specifying a delivery schedule.

18. The device of claim 15, wherein conformance of the bitstream is defined based on conformance of all of the partitions of each of the plurality of partitioning schemes.

19. The device of claim 15, wherein the device comprises at least one of:
an integrated circuit;
a microprocessor; or
a wireless communication device.

20. The device of claim 15, further comprising a camera configured to capture the video data.

21. A device for testing bitstream conformance, the device comprising:
means for storing video data; and
means for decoding a bitstream, the bitstream comprising an encoded representation of the video data, the means for decoding the bitstream comprising means for obtaining, from the bitstream, a video parameter set (VPS), wherein an output layer set is signaled in the VPS and the VPS includes a syntax element indicating a number of partitioning schemes in a list of partitioning schemes for the output layer set, the list of partitioning schemes for the output layer set including a plurality of different partitioning schemes for the output layer set, wherein:
the bitstream comprises a plurality of layers, Network Access Layer (NAL) units of the bitstream having different layer identifiers belonging to different layers of the plurality of layers, and;
for each respective partitioning scheme of the plurality of partitioning schemes, the respective partitioning scheme is a way of dividing the output layer set into a respective set of one or more partitions that is different from ways of dividing the output layer set of other partitioning schemes of the plurality of partitioning schemes, each of the one or more partitions containing one or more of the layers, the VPS including a respective syntax element for the respective partitioning scheme indicating a total number of partitions in the respective set of partitions, and each layer in the output layer set belonging to exactly one partition in the respective partitioning scheme; and means for obtaining, for each respective partitioning scheme of the plurality of partitioning schemes for the output layer set, from a Supplemental Enhancement Information (SEI) message in the bitstream or video usability information (VUI) in the VPS, a respective set of syntax elements indicating hypothetical reference decoder (HRD) parameter sets for the respective partitioning scheme.

22. The device of claim 21, further comprising: for each respective partition of each respective partitioning scheme of the plurality of partitioning schemes, means for applying, based on the respective partition not containing all layers of the output layer set, a partition-specific coded picture buffer (CPB) operation.

23. The device of claim 21, wherein the means for obtaining the respective set of syntax elements indicating the HRD parameter sets for the respective partitioning scheme comprises:
  means for obtaining, from a bitstream scheduling parameters (BSP) syntax structure within the VUI, one or more HRD parameter sets; and
  for each respective combination in a set of one or more schedule combinations for the respective partitioning scheme:
    for each respective partition of the respective partitioning scheme:
      means for obtaining, from the BSP syntax structure, a respective syntax element specifying, for the respective partition, one of the HRD parameter sets in the BSP syntax structure; and
      means for obtaining, from the BSP syntax structure, a respective syntax element specifying a delivery schedule.

24. The device of claim 21, wherein the means for obtaining the respective set of syntax elements indicating the HRD parameter sets for the respective partitioning scheme comprises:
  means for obtaining, from a bitstream scheduling parameters (BSP) syntax structure within the SEI message, one or more HRD parameter sets; and
  for each respective combination in a set of one or more schedule combinations for the respective partitioning scheme:
    for each respective partition of the respective partitioning scheme:
      means for obtaining, from the BSP syntax structure, a respective syntax element specifying, for the respective partition, one of the HRD parameter sets in the BSP syntax structure; and
      means for obtaining, from the BSP syntax structure, a respective syntax element specifying a delivery schedule.

25. The device of claim 21, wherein conformance of the bitstream is defined based on conformance of all of the partitions of each of the plurality of partitioning schemes.

26. The device of claim 21, wherein, for each respective partition of each respective partitioning scheme of the plurality of partitioning schemes, testing the conformance of the respective partition assumes that decoded pictures and other necessary information from direct and indirect reference layers of the layers in the respective partition, and that are not contained in the respective partition, are available at the time of decoding the pictures of the layers in the respective partition.

27. The method of claim 1, further comprising: for each respective partition of each respective partitioning scheme of the plurality of partitioning schemes, testing, based on the HRD parameter sets for the respective partitioning scheme, the respective partition for conformance to a video coding standard.

28. The device of claim 7, wherein the one or more processors are further configured such that, for each respective partition of each respective partitioning scheme of the plurality of partitioning schemes, test, based on the HRD parameter sets for the respective partitioning scheme, the respective partition for conformance to a video coding standard.

29. The device of claim 21, further comprising means for testing, for each respective partition of each respective partitioning scheme of the plurality of partitioning schemes, based on the HRD parameter sets for the respective partitioning scheme, the respective partition for conformance to a video coding standard.

* * * * *